United States Patent
Sang et al.

(10) Patent No.: US 11,773,020 B2
(45) Date of Patent: *Oct. 3, 2023

(54) GYPSUM COMPOSITION COMPRISING UNCOOKED STARCH HAVING MID-RANGE VISCOSITY, AND METHODS AND PRODUCTS RELATED THERETO

(71) Applicant: UNITED STATES GYPSUM COMPANY, Chicago, IL (US)

(72) Inventors: Yijun Sang, Oak Park, IL (US); Brian J. Christ, Burlington, IA (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/306,460

(22) Filed: May 3, 2021

(65) Prior Publication Data

US 2021/0253476 A1 Aug. 19, 2021

Related U.S. Application Data

(63) Continuation of application No. 16/027,028, filed on Jul. 3, 2018, now Pat. No. 11,008,257, which is a (Continued)

(51) Int. Cl.
*C04B 24/10* (2006.01)
*B32B 13/02* (2006.01)
(Continued)

(52) U.S. Cl.
CPC .............. *C04B 24/10* (2013.01); *B32B 13/02* (2013.01); *C04B 24/38* (2013.01); *C04B 28/14* (2013.01);
(Continued)

(58) Field of Classification Search
None
See application file for complete search history.

(56) References Cited

U.S. PATENT DOCUMENTS 1,769,519 A 7/1930 King et al.
2,388,543 A 11/1945 Hoggatt
(Continued)

FOREIGN PATENT DOCUMENTS

FR 2220639 A1 10/1974
WO 2006/122095 A2 11/2006
(Continued)

OTHER PUBLICATIONS

Ali et al., International Journal of Food Properties, vol. 17, pp. 523-535 (Year: 2014).*
(Continued)

*Primary Examiner* — Ramsey Zacharia
(74) *Attorney, Agent, or Firm* — Greer, Burns & Crain, Ltd.; Philip T. Petti; Pradip Sahu

(57) ABSTRACT

Disclosed are product (e.g., board), slurry, and methods relating to an uncooked starch that can be used to enhance strength in one or more gypsum layers in the board. The uncooked starch has a hot water viscosity of from about 20 BU to about 300 BU according to the HWVA method, and/or a mid-range peak viscosity of from about 120 Brabender Units to about 1000 Brabender Units.

15 Claims, 6 Drawing Sheets

Related U.S. Application Data continuation-in-part of application No. 15/934,088, filed on Mar. 23, 2018, now Pat. No. 10,919,808.

(60) Provisional application No. 62/534,041, filed on Jul. 18, 2017.

(51) Int. Cl.
| | |
|---|---|
| C04B 24/38 | (2006.01) |
| C04B 28/14 | (2006.01) |
| E04B 2/72 | (2006.01) |
| C08B 31/06 | (2006.01) |
| C08L 3/02 | (2006.01) |
| C08L 3/06 | (2006.01) |
| C04B 2/02 | (2006.01) |
| C04B 111/00 | (2006.01) |

(52) U.S. Cl.
CPC ... *B32B 2607/00* (2013.01); *C04B 2111/0062* (2013.01); *C04B 2201/10* (2013.01); *C04B 2235/447* (2013.01); *E04B 2/723* (2013.01)

(56) References Cited

U.S. PATENT DOCUMENTS

| | | | |
|---|---|---|---|
| 2,487,036 A | 11/1949 | Wise | |
| 2,985,219 A | 5/1961 | Summerfield | |
| 3,414,467 A | 12/1968 | Ferrara | |
| 3,573,947 A | 4/1971 | Kinkade et al. | |
| 4,009,062 A | 2/1977 | Long | |
| 4,238,178 A | 12/1980 | Bailey | |
| 4,239,716 A | 12/1980 | Ishida et al. | |
| 4,279,673 A | 7/1981 | White et al. | |
| 4,392,896 A | 7/1983 | Sakakibara | |
| 4,645,548 A | 2/1987 | Take et al. | |
| 5,085,929 A | 2/1992 | Bruce et al. | |
| 5,320,677 A | 6/1994 | Baig | |
| 5,643,510 A | 7/1997 | Sucech | |
| 5,683,635 A | 11/1997 | Sucech et al. | |
| 5,736,209 A | 4/1998 | Andersen et al. | |
| 5,817,262 A | 10/1998 | Englert | |
| 5,922,447 A | 7/1999 | Baig | |
| 6,221,151 B1 | 4/2001 | Campbell et al. | |
| 6,342,284 B1 | 1/2002 | Yu et al. | |
| 6,409,825 B1 | 6/2002 | Yu et al. | |
| 6,443,258 B1 | 9/2002 | Putt et al. | |
| 6,494,609 B1 | 12/2002 | Wittbold et al. | |
| 6,632,550 B1 | 10/2003 | Yu et al. | |
| 6,783,587 B2 | 8/2004 | Sethuraman et al. | |
| 6,815,049 B2 | 11/2004 | Veeramasuneni et al. | |
| 6,822,033 B2 | 11/2004 | Yu et al. | |
| 6,874,930 B2 | 4/2005 | Wittbold et al. | |
| 7,364,015 B2 | 4/2008 | Englert et al. | |
| 7,364,676 B2 | 4/2008 | Sucech et al. | |
| 7,413,603 B2 | 8/2008 | Miller et al. | |
| 7,851,057 B2 | 12/2010 | Englert et al. | |
| 7,862,687 B2 | 1/2011 | Englert et al. | |
| 7,875,358 B2 | 1/2011 | Englert et al. | |
| 8,070,895 B2 | 12/2011 | Englebrecht et al. | |
| 8,323,785 B2 | 12/2012 | Yu et al. | |
| 9,174,881 B2 | 11/2015 | Cimaglio et al. | |
| 10,683,235 B2 | 6/2020 | Morlat et al. | |
| 10,919,808 B2 * | 2/2021 | Sang | C04B 22/16 |
| 11,008,257 B2 | 5/2021 | Sang et al. | |
| 2005/0126437 A1 | 6/2005 | Tagge et al. | |
| 2007/0048490 A1 | 3/2007 | Yu et al. | |
| 2007/0059513 A1 | 3/2007 | Yu et al. | |
| 2007/0102237 A1 | 5/2007 | Baig | |
| 2008/0090068 A1 | 4/2008 | Yu | |
| 2009/0247937 A1 | 10/2009 | Rontal | |
| 2010/0143682 A1 | 6/2010 | Shake et al. | |
| 2010/0203317 A1 | 8/2010 | Sahay | |
| 2010/0247937 A1 | 9/2010 | Liu et al. | |
| 2012/0148873 A1 | 6/2012 | Biltresse et al. | |
| 2012/0168527 A1 | 7/2012 | Li et al. | |
| 2012/0170403 A1 | 7/2012 | Li et al. | |
| 2012/0207989 A1 | 8/2012 | Xu et al. | |
| 2012/0219785 A1 | 8/2012 | Yu et al. | |
| 2014/0113124 A1 | 4/2014 | Sang et al. | |
| 2014/0113128 A1 | 4/2014 | Sang et al. | |
| 2015/0104629 A1 | 4/2015 | Cao et al. | |
| 2015/0175482 A1 | 6/2015 | Stav et al. | |
| 2016/0230013 A1 | 8/2016 | Englert et al. | |
| 2016/0375655 A1 | 12/2016 | Li et al. | |
| 2016/0376191 A1 | 12/2016 | Li et al. | |
| 2017/0267587 A1 | 9/2017 | Abolt et al. | |
| 2017/0362124 A1 | 12/2017 | Sang et al. | |
| 2018/0065336 A1 | 3/2018 | Shubert et al. | |

FOREIGN PATENT DOCUMENTS

| | | |
|---|---|---|
| WO | 2011/020528 A1 | 2/2011 |
| WO | 2014/066079 A2 | 5/2014 |
| WO | 2015/050804 A1 | 4/2015 |
| WO | 2015/095600 A2 | 6/2015 |
| WO | 2018229634 A1 | 12/2018 |

OTHER PUBLICATIONS

Burrows, B., "A Decade's Experience of Gypsum Board Weight Reduction in the U.S.," 14. Internationale Baustofftagung 1. 0197-1.0207, Weimar, 20-23, 2000, 11 pages.

Peterson, K., "Engineered Gypsum Panels, the Development and Application of Densified Zones at the Paper/Core Interface of Gypsum Panels," Proceedings of Gypsum 2000, 6th International Conference on Natural and Synthetic Gypsum, Toronto, Canada, 2000, 9 pages.

Sandhu, K, et al., "A comparison of native and acid thinned normal and waxy corn starches: Physicochemical, thermal, morphological and pasting properties," LWD 40, 2007, pp. 1527-1536.

International Search Report and Written Opinion received in PCT/US2018/042613 dated Oct. 17, 2017.

Food and Glue Industrial Glue Handbook, description of starch as an adhesive, Huaqiao University, Apr. 1987, Fujian People's Publishing House, First Edition, p. 457. (English Translation).

CSR Building Products, "GYPROCK, Optimised Core: The secret to a stronger, lighter board," Product brochure, 3550, 2015, 6 pages.

Search Report received in Brazilian Application No. BR112020001039-1, dated May 18, 2022. (English Translation).

Office Action received in Chinese Application No. 201880047644.2, dated Jul. 4, 2022. (English Translation).

Zhang, L., et al., "Modem Research Methods in Polymer Physics," Wuhan University Press, 2nd Edition, 2006, 4 pages. (English Translation).

Hapman Ideas That Move,"Bulk Materials Density Guide," 2020, retrieved from https://web.archive.org/web/20200520201548/https://hapman.com/news-and-knowledge/bulk-material-density-guide/, 65 pages.

Final Office Action received in U.S. Appl. No. 17/159,922, dated Mar. 24, 2023.

Notice of Examination received in Vietnamese Application No. 1-2020-00598, dated Apr. 25, 2023 (w/English Translation).

Office Action received in Korean Application No. 10-2020-7003261, dated May 29, 2023 (w/English Translation).

Examination Report received in Australian Application No. 2018303666, dated Jun. 9, 2023.

Pretrial Report received for Japanese Application No. 2020-502401, dated May 16, 2023 (w/English Translation).

\* cited by examiner

GYPSUM COMPOSITION COMPRISING UNCOOKED STARCH HAVING MID-RANGE VISCOSITY, AND METHODS AND PRODUCTS RELATED THERETO

CROSS-REFERENCE TO RELATED APPLICATIONS

This patent application is a continuation application of and claims priority to U.S. patent application Ser. No. 16/027,028 filed Jul. 3, 2018, which is a continuation-in-part of U.S. patent application Ser. No. 15/934,088 filed Mar. 23, 2018, now U.S. Pat. No. 10,919,808, which claims the benefit of priority to U.S. Provisional Patent Application No. 62/534,041, filed Jul. 18, 2017, all of which are incorporated in their entirety by reference herein.

BACKGROUND

Set gypsum is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

Gypsum (calcium sulfate dihydrate) is naturally occurring and can be mined in rock form. It can also be in synthetic form (referred to as "syngyp" in the art) as a by-product of industrial processes such as flue gas desulfurization. From either source (natural or synthetic), gypsum can be calcined at high temperature to form stucco (i.e., calcined gypsum typically in the form of calcium sulfate hemihydrate) and then rehydrated to form set gypsum in a desired shape (e.g., as a board). During manufacture of the board, the stucco, water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

The excess water that is driven off represents an inefficiency in the system. Energy input is required to remove the water, and the manufacturing process is slowed to accommodate the drying step. However, reducing the amount of water in the system has proven to be very difficult without compromising other critical aspects of commercial product, including board weight and strength.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY

The invention relates, at least in part, to the use of an uncooked starch having a desired viscosity in various gypsum-related slurries, board, methods, and products. In accordance with embodiments of the invention, the uncooked starch of desired viscosity can be included in gypsum slurries (along with stucco, water, and other desired additives such as one or more of foam, dispersants, polyphosphates, accelerators, retarders, etc.) to enhance strength in a resulting product, e.g., gypsum board (such as in the form of wallboard, which, as used herein includes drywall used for interior wall surfaces, ceilings, partitions and the like). More particularly, the starch has (i) a hot water viscosity of from about 20 BU to about 300 BU according to the hot water viscosity assay (HWVA method) described herein, and/or (ii) a mid-range peak viscosity of from about 120 BU to 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of –3° C./minute. While not wishing to be bound by any particular theory, it is believed that uncooked starches having the viscosity as described herein allows for the starch molecules to move out of granules and thereby impart strength in the gypsum composition (e.g., containing an interlocking matrix of set gypsum) resulting from the stucco slurry.

Advantageously, the uncooked starches of desired viscosity in accordance with embodiments of the invention are generally heavier and exhibit a higher bulk density with less variability than pregelatinized starches. In this regard, pregelatinized starches can have a high variability in bulk density, which can cause inaccurate feeding of starch into the stucco slurry. In addition, the uncooked starch of desired viscosity advantageously can allow for a lower water demand in a gypsum wallboard manufacturing process. For example, the uncooked starch of desired viscosity can reduce water demand in a stucco slurry by at least about 10% (e.g., at least about 20%) compared to a pregelatinized starch in the otherwise same stucco slurry.

Thus, in one aspect, the invention provides gypsum board. The board comprises a set gypsum core disposed between two cover sheets, the core formed from a slurry comprising stucco, water, and at least one uncooked starch having a hot water viscosity of from about 20 Brabender Units ("BU") to about 300 Brabender Units. The viscosity is measured by the HWVA method.

In another aspect, the invention provides a stucco slurry (sometimes called "stucco slurry"). The slurry comprises stucco, water, and at least one uncooked starch having a hot water viscosity of from about 20 Brabender Units to about 300 Brabender Units when the viscosity is measured by the HWVA method.

In another aspect, the invention provides a method of preparing gypsum board. The method comprises mixing at least water, stucco, and at least one uncooked starch having a hot water viscosity of from about 20 Brabender Units to about 300 Brabender Units when the viscosity is measured by the HWVA method. The slurry is disposed between a first cover sheet and a second cover sheet to form a wet assembly. The wet assembly is cut into a board, and the board is dried.

In another aspect, the invention provides an acoustical panel comprising an acoustical component comprising fiber and at least one uncooked starch having a hot water viscosity of from about 20 Brabender Units to about 300 Brabender Units when the viscosity is measured by HWVA method. The panel preferably has a Noise Reduction Coefficient of at least about 0.5 according to ASTM C 423-02.

In another aspect, the invention provides gypsum board. The board comprises a set gypsum core disposed between two cover sheets, the core formed from a slurry comprising stucco, water, and at least one uncooked starch having a peak viscosity of from about 120 Brabender Units ("BU") to about 1000 Brabender Units. The viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The maximal viscosity is recorded as the peak viscosity.

In another aspect, the invention provides another gypsum board. The gypsum board comprises a set gypsum core disposed between two cover sheets, the core formed from a slurry comprising stucco, water, and at least one uncooked starch having a cold water viscosity of from about 1 centipoise to about 50 centipoise at 10% solids in water when the viscosity is measured by Brookfield viscometer at 25° C.

In another aspect, the invention provides a stucco slurry (sometimes called "stucco slurry"). The slurry comprises stucco, water, and at least one uncooked starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

In another aspect, the invention provides another stucco slurry. The slurry comprises stucco, water, and at least one uncooked starch having a cold water viscosity of from about 1 centipoise to about 50 centipoise at 10% of solids in water when the viscosity is measured by Brookfield viscometer at 25° C.

In another aspect, the invention provides a method of preparing gypsum board. The method comprises mixing at least water, stucco, and at least one uncooked starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The slurry is disposed between a first cover sheet and a second cover sheet to form a wet assembly. The wet assembly is cut into a board, and the board is dried.

In another aspect, the invention provides a method of preparing gypsum board. The method comprises mixing at least water, stucco, and at least one uncooked starch having a cold water viscosity of from about 1 centipoise to about 50 centipoise at 10% of solids in water when the viscosity is measured by Brookfield viscometer at 25° C. The slurry is disposed between a first cover sheet and a second cover sheet to form a wet assembly. The wet assembly is cut into a board, and the board is dried.

In another aspect, the invention provides an acoustical panel comprising an acoustical component comprising fiber and at least one uncooked starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The panel preferably has a Noise Reduction Coefficient of at least about 0.5 according to ASTM C 423-02.

In another aspect, the invention provides an acoustical panel comprising an acoustical component comprising fiber and at least one uncooked starch having a cold water viscosity of from about 1 centipoise to about 50 centipoise at 10% of solids in water when the viscosity is measured by Brookfield viscometer at 25° C. The panel preferably has a Noise Reduction Coefficient of at least about 0.5 according to ASTM C 423-02.

DETAILED DESCRIPTION

Figure 1:
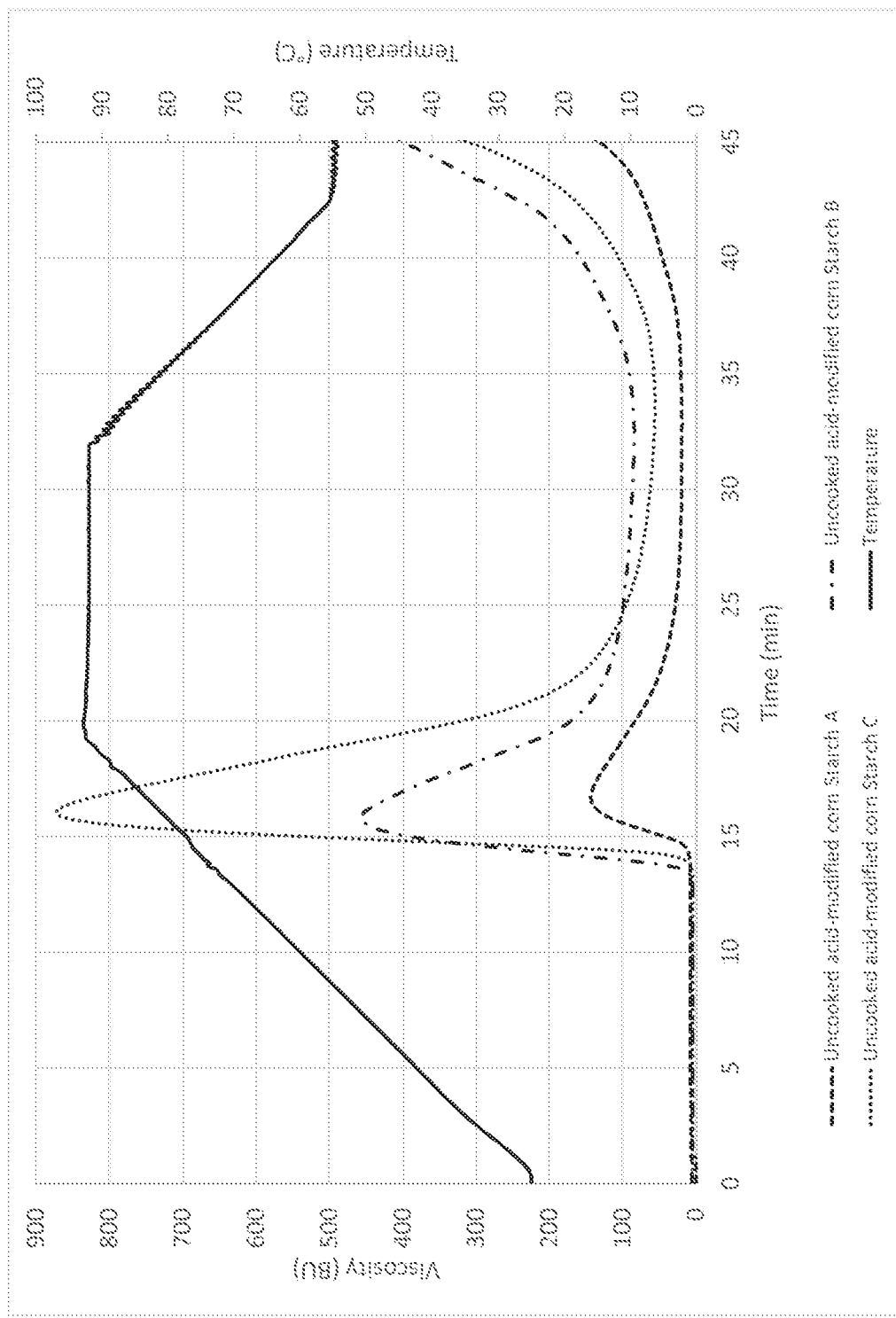
FIG. 1 is a Brabender amylogram of slurries of 15% starch in water, illustrating the viscosity of starch, where the X-axis is time and the Y-axis superimposes viscosity (primary Y-axis, on the left) and temperature (secondary Y-axis, on the right), in accordance with embodiments of the invention, as described in Example 1.

Embodiments of the present invention are premised, at least in part, on including in a stucco slurry (sometimes called a "gypsum slurry") an uncooked starch for enhancing strength in a resulting board having one or more gypsum layers formed from the gypsum slurry. In one aspect, the uncooked starch has a hot water viscosity of from about 20 Brabender Units to about 300 Brabender Units according to the hot water viscosity assay (HWVA) method described herein. In an additional or alternative aspect, the uncooked starch is characterized as having "mid-range" peak viscosity (e.g., from about 120 Brabender Units to about 1000 Brabender Units as measured according to the methodology described herein). Although the viscosity characteristic is determined as the starch is placed under certain conditions according to the viscosity measurement methodology described herein, it will be understood that the uncooked starch need not be added to the slurry under these conditions. Conventional use of non-migratory uncooked starches was undesirable with gypsum slurries because core strength was not significantly improved, although small chain migratory starches were used for enhancing paper-core bond. Embodiments of the invention unexpectedly overcome this drawback.

Surprisingly, it has been found that starches with the desired hot water viscosity are effective for use in gypsum slurries for increasing strength in the resulting board product. As described herein, selecting a mid-range hot water viscosity for use in a gypsum (stucco) slurry, i.e., from about 20 BU to about 300 BU according to the HWVA method, surprisingly results in a desired molecular size and good resulting strength of a gypsum layer in the final product. In this respect, it has unexpectedly been found that hot water viscosity correlates to a desired molecular size in a variety of starches, including, for example tapioca, wheat, potato, corn, and other starches. In some embodiments, where corn starch is used, peak viscosity as discussed herein can be used to correlate molecular size. In this regard, it has been discovered that peak viscosity correlates effectively with molecular size and hence board strength for corn starches. Without wishing to be bound by any particular theory, surprisingly, for any one type of starch, peak viscosity correlates to molecular weight.

However, between two different types of starches, this correlation may not exist. For example, there can be instances with wheat starch where a lower peak viscosity has a higher molecular size than corn starch with higher peak viscosity. Thus, it has been found that, surprisingly and unexpectedly, hot water viscosity has better correlation to molecular size across a variety of starches. If desired, however, in the case of evaluating a single starch, the peak viscosity as described herein can be used.

It has been found that the inclusion of the uncooked starch according to the invention confers benefits such as with respect to starch efficiency (e.g., so that less starch can be used), product strength enhancements, and water demand, e.g., in unison in some embodiments. In accordance with embodiments of the invention, the benefits, including with respect to starch efficiency, water demand, and/or strength, represent a considerable improvement and advancement over non-gelatinized starches (uncooked) having hot water viscosity below 20 BU or above 300 BU, and/or peak viscosity below 120 BU or above 1000 BU. In addition, it has been found that, surprisingly and unexpectedly, in some embodiments, the drying rate of slurries containing uncooked starch is similar to the drying rate of slurries containing pregelatinized starch. This is particularly surprising because the uncooked starch needs to absorb extra heat energy to gelatinize the starch. These discoveries impart considerable advantages, including, but not limited to, reducing cost of raw material, enhancing manufacturing efficiency, and enhancing product strength, e.g., allowing for lower weight product with sufficient strength properties.

The uncooked starch according to the invention can be included in a stucco slurry for forming a gypsum layer in a board in embodiments of the invention, and can be used with gypsum board layers (e.g., core) that optionally have a skim coat on one or both major surfaces of the core. In some embodiments, the board core formed from a stucco slurry containing an uncooked starch can have a concentrated layer on one or both major surfaces of the core as described in commonly assigned, co-pending U.S. patent application Ser. Nos. 15/186,176; 15/186,212; 15/186,232; and Ser. No. 15/186,257, which concentrated layer arrangements are incorporated herein by reference.

Starches are classified as carbohydrates and contain two types of polysaccharides, namely linear amylose, and branched amylopectin. Starch granules are semi-crystalline, e.g., as seen under polarized light, and are insoluble at room temperatures.

The starch is uncooked in accordance with embodiments of the invention. Uncooked starches are characterized as being cold water insoluble and having a semi-crystalline structure. Typically, uncooked starches are obtained by wet milling and are not modified by heating wet starch as in the case of cooked starches. It is to be noted that the uncooked starch according to the invention is different than cooked starches, which are characterized by being cold water soluble and having a non-crystalline structure. Cooked starches are prepared by heating wet starch, and can be prepared, e.g., by extrusion techniques. See, e.g., co-pending U.S. patent application Ser. Nos. 14/494,547; 14/044,582; and Ser. No. 13/835,002. Cooked starches are sometimes referred to as pregelatinized starches, because the crystalline structure of the starch granules melts, and results in starch gelatinization, which is characterized by the disappearance of the birefringence under a microscope with a polarized light.

Preferred uncooked starches are different than acid-modified migratory starches which do not confer the same strength properties and are used in the art for paper-core bond enhancement as they migrate to the paper-core interface due to their smaller chain lengths. The acid-modified migratory starches have minimal molecular weight, typically below about 6,000 Daltons. Preferred uncooked starches in accordance with embodiments of the invention have higher molecular weights than migratory starches, e.g., at least about 15,000 Daltons. The average molecular weight is indicated by the hot water viscosity. Preferred uncooked starches have a hot water viscosity from about 20 BU to about 300 BU.

In some embodiments, the uncooked starch has a higher bulk density with less variability than found in pregelatinized starch. This is surprisingly useful because, for example, consistent density allows a volumetric feeder to add starch more accurately and consistently. For example, in some embodiments the bulk density can be from about 35 pcf to about 50 pcf, from about 35 pcf to about 45 pcf, from about 37 pcf to about 50 pcf, from about 37 pcf to about 45 pcf, from about 40 pcf to about 50 pcf, from about 40 pcf to about 47 pcf, from about 40 pcf to about 45 pcf, from about 41 pcf to about 45 pcf, etc.

In contrast with the uncooked starches according to the invention, gelatinization is the process in which the starch is placed in water and heated ("cooked") such that the crystalline structure of the starch granules is melted and the starch molecules dissolve in water such that a good dispersion results. It has been found that, when transforming a starch granule to gelatinized form, initially the starch granule provides little viscosity in water because starch granules are water insoluble. As the temperature increases, the starch granule swells and the crystalline structure melts at the gelatinization temperature. The peak viscosity is when the starch granule has maximum swelling. Further heating will break the starch granules and dissolve the starch molecules in water, with a precipitous dropoff in viscosity. After cooling, the starch molecule will reassociate to form a 3-D gel structure, with the viscosity increasing due to the gel structure.

The uncooked starches according to embodiments of the invention typically are in native, granular form. In accordance with some embodiments of the invention, the granular uncooked form can undergo at least some degree of gelatinization during gypsum wallboard manufacture (e.g., in the kiln).

To achieve the desired viscosities according to embodiments of the invention, the uncooked starch molecule can be modified, e.g., to hydrolyze glycosidic bonds between glucose units to achieve desired molecular weight. For example, such modifications can include acid modifications, enzyme modifications, and/or other methods. The most commonly used starch converting enzyme is α-amylase (alpha-amylase). The enzyme hydrolysis reaction can be stopped either by adjusting the pH or by heating. To prepare acid-modified starches, it will be appreciated that aqueous suspension of unmodified starch can be treated with, e.g., a small quantity of acid, e.g., a strong acid such as hydrochloric acid, sulfuric acid, nitric acid, hydrofluoric acid, or the like. By adjusting reaction time, the degree of depolymerization can be modified. For example, when the proper fluidity is achieved, e.g., as determined by in-process laboratory controls, mild alkali is introduced to neutralize the acid and stop hydrolysis. Thus, acid-modified starches can be prepared in various fluidities. Also, acid-modified starches may be used directly after neutralization without further purification or may be purified to remove salts. The end use of the acid-modified starch may determine the desirability of purification. For example, a composition of starch modified by sulfuric acid and neutralized by calcium hydroxide may contain sulfate and calcium ions which could be added to a stucco and water slurry. Since the stucco has sulfate and calcium ions already, it may not be necessary to purify the sulfuric acid-modified starch prior to addition to the slurry. Thus, considerations to determine the desirability of purification include, for example, the identity of the acid and alkali base and whether it is desirable to add other ions besides sulfate or calcium ions to the slurry.

Uncooked starches exhibiting the viscosity characteristic according to the invention provide significant benefits to the strength of the product (e.g., wallboard). Since starch contains glucose monomers containing three hydroxy groups, starch provides many sites for hydrogen bonding to gypsum crystals. While not wishing to be bound by any particular theory, it is believed that the molecular size of the uncooked starches that exhibit the hot water viscosity characteristic allows for optimal mobility of starch molecules to align starch molecules with the gypsum crystals to facilitate good binding of starch to gypsum crystals to strengthen the resulting crystalline gypsum matrix, e.g., via hydrogen bonding. Uncooked starches having viscosities outside the desired hot water viscosity range, which would have either longer chain lengths and higher molecular weight (viscosity that is too high) and shorter chain lengths and lower molecular weights (viscosity that is too low), respectively, do not provide the same combination of benefits. Accordingly, because of the optimal binding between gypsum crystals and the uncooked starch molecules of desired hot water viscosity, in effect the strength of the crystalline gypsum matrix is enhanced, and less starch is required to promote that strength compared with conventional starches. Uncooked starches surprisingly and unexpectedly result in lower water demand in gypsum slurries because of the surprisingly high fluidity of the stucco slurry containing uncooked starches.

The uncooked starch added to the gypsum (stucco) slurry desirably has a mid-range molecular weight, indicated by a hot water viscosity of from about 20 BU to about 300 BU. The mid-range hot water viscosity of the uncooked starch is determined according to the HWVA method described herein. The mid-range peak viscosity is measured by the following method. The Brabender peak viscosity is measured using a Viscograph-E (C.W. Brabender) set to 75 rpm; 700 cmg. The starch is in a slurry having a concentration of 15% solids in water. The starch slurry is heated from 25° C. to 95° C. at a rate of 3° C./min. It is then held at 95° C. for 10 min until being cooled 50° C. at a rate of −3° C./min. The peak viscosity is determined as the maximum viscosity.

The hot water viscosity of the uncooked starch is generally above 20 BU and can be from about 20 BU to about 300 BU, such as from about 20 BU to about 280 BU, from about 20 BU to about 250 BU, from about 20 BU to about 200 BU, from about 20 BU to about 175 BU, from about 20 BU to about 150 BU, from about 20 BU to about 125 BU, from about 20 BU to about 100 BU, from about 20 BU to about 75 BU, from about 20 BU to about 50 BU, from about 30 BU to about 300 BU, from about 30 BU to about 280 BU, from about 30 BU to about 250 BU, from about 30 BU to about 150 BU, from about 30 BU to about 125 BU, from about 30 BU to about 100 BU, from about 30 BU to about 75 BU, from about 30 BU to about 50 BU, from about 50 BU to about 300 BU, from about 50 BU to about 280 BU, from about 50 BU to about 250 BU, from about 50 BU to about 200 BU, from about 50 BU to about 150 BU, from about 50 BU to about 100 BU, from about 100 BU to about 300 BU, from about 100 BU to about 280 BU, from about 100 BU to about 250 BU, from about 100 BU to about 200 BU, from about 100 BU to about 150 BU, from about 150 BU to about 300 BU, from about 150 BU to about 280 BU, from about 150 BU to about 250 BU, from about 150 BU to about 200 BU, from about 200 BU to about 300 BU, or from about 200 BU to about 280 BU.

In some embodiments, the starch has a peak viscosity of at least about 100 Brabender Units, and can be from about 120 Brabender Units to about 1000 Brabender Units, e.g., from about 120 Brabender Units to about 875 Brabender Units, from about 120 Brabender Units to about 850 Brabender Units, from about 120 Brabender Units to about 700 Brabender Units, from about 120 Brabender Units to about 550 Brabender Units, from about 120 Brabender Units to about 460 Brabender Units, from about 120 Brabender Units to about 300 Brabender Units, from about 150 Brabender Units to about 1000 Brabender Units, from about 150 Brabender Units to about 850 Brabender Units, from about 150 Brabender Units to about 750 Brabender Units, from about 150 Brabender Units to about 500 Brabender Units, from about 150 Brabender Units to about 300 Brabender Units, from about 250 Brabender Units to about 850 Brabender Units, from about 250 Brabender Units to about 600 Brabender Units, from about 250 Brabender Units to about 500 Brabender Units, from about 300 Brabender Units to about 875 Brabender Units, from about 350 Brabender Units to about 800 Brabender Units, from about 350 Brabender Units to about 750 Brabender Units, from about 400 Brabender Units to about 1000 Brabender Units, from about 400 Brabender Units to about 875 Brabender Units, from about 400 Brabender Units to about 700 Brabender Units, from about 500 Brabender Units to about 850 Brabender Units, from about 500 Brabender Units to about 700 Brabender Units, from about 600 Brabender Units to about 1000 Brabender Units, etc.

Properties of uncooked starches include having low viscosity in cold water (i.e., at a temperature of 77° F. (25° C.)), in contrast with properties of pregelatinized starches include having instant high viscosity in cold water. Uncooked starches according to the disclosure preferably have a cold water viscosity of about less than 50 centipoise, e.g., about 40 centipoise or less, about 30 centipoise or less, about 20 centipoise or less, or about 10 centipoise or less in cold water (e.g., from about 1 centipoise to about 50 centipoise, from about 1 centipoise to about 40 centipoise, from about 1 centipoise to about 30 centipoise, from about 1 centipoise to about 20 centipoise, from about 1 centipoise to about 10 centipoise, from about 5 centipoise to about 50 centipoise, from about 5 centipoise to about 30 centipoise, from about 5 centipoise to about 20 centipoise, from about 3 centipoise to about 15 centipoise, from about 3 centipoise to about 10 centipoise, from about 3 centipoise to about 7 centipoise, etc.). The cold water viscosity is measured according to a Brookfield viscometer method with a testing profile as follows. Starch (20 g, dry) is added into water (180 g) in a Waring blender (model 31BL92) while mixing at low speed for 15 seconds. Starch solution (200 g) is transferred into a measuring cup. No. 2 paddle and 60 RPM are selected. The viscosity value measured at 20 seconds is used as the viscosity of the starch.

Uncooked starches according to embodiments of the invention advantageously are easy to mix with water. This is because of their low viscosity in water. In contrast, pregelatinized starches can undesirably sometimes cause "fish eye," which is a condition that is characterized by one or more large lumps that form in the water solution during mixing.

While not wishing to be bound by any particular theory, during the mixing process, the large lumps are believed to be caused by fast water absorption of the starch, forming a viscous film on the surface of the lump, which prevents water penetration of the lump. Uncooked starches are believed to avoid the fish eye condition because of their cold water insolubility, which results in the separation of starch granules.

Examples of suitable uncooked starches include, but are not limited to, one or more of native cereal starches, native root starches, native tuber starches, and/or chemically modified starches, with specific representative examples including, e.g., corn starch (normal, waxy, and/or high-amylose), A type wheat starch, B type wheat starch, pea starch, potato starch, tapioca, substituted starches having substituted groups (such as acetate, phosphate, hydroxyethyl, hydroxypropyl) on starch hydroxyl groups, or any combination thereof.

Stucco slurry is normally formed inside a pin or pinless main mixer during the manufacturing process. However, the mode of introduction of ingredients into the mixer may vary. For example, various combinations of components may be pre-mixed before entering the mixer, e.g., one or more dry ingredients and/or one or more wet ingredients may be pre-mixed. By "added to the slurry," as used herein, it will be understood that ingredients may be pre-mixed in any suitable manner prior to entry into the mixer where the gypsum (stucco) slurry is formed as set forth herein.

The uncooked starch of desired hot water and/or peak viscosity characteristic of the invention can be included in the stucco slurry in a wet or dry form. If in a wet form, the starch can be included in any suitable concentration, and could be pre-mixed with other wet ingredients.

As used herein, uncooked means that the starch has a degree of gelatinization of less than about 5% (e.g., less than about 3%, or less than about 1%, such as zero) before being included in the stucco slurry. In some embodiments, the uncooked starch can be partially or fully gelatinized when exposed to elevated temperature in the gypsum wallboard manufacturing process, e.g., in the kiln for the drying step to remove excess water.

The uncooked starch having the hot water and/or peak viscosity characteristic in accordance with embodiments of the present invention surprisingly and unexpectedly can be included in the slurry in a relatively low amount (solids/solids basis) and still achieve significant strength enhancement in the board. Accordingly, in preferred embodiments of the invention, the uncooked starch having the hot water and/or peak viscosity characteristic is included in the stucco slurry in an amount that is about 5% or less by weight of the stucco (e.g., from about 1% to about 4%) or even less, such as about 2% or less by weight of the stucco. For example, the uncooked starch can be included in an amount from about 0.5% to about 5% by weight of the stucco, about 0.5% to about 4% by weight of the stucco, about 1% to about 3%, about 1% to about 2%, about 1.5% to about 2%, etc.

Uncooked starches having the desired hot water and/or peak viscosity characteristic can be combined with other starches in accordance with embodiments of the invention. For example, the uncooked starches exhibiting the desired viscosity characteristic can be combined with other starches to enhance both core strength and paper-core bond, particularly if some increase in water demand is accepted. Thus, in some embodiments of the invention, stucco slurry may include one or more uncooked starches having the hot water and/or peak viscosity characteristic, as well as one or more other types of starches. Other starches can include, for example, pregelatinized starches. Examples include pregelatinized corn starches, e.g., having a viscosity of about 773 centipoise or 100 centipoise, respectively, according to the VMA method as set forth in U. S. Patent Application Publication 2012/0113124. The other starches may also be in the form of, e.g., non-pregelatinized starches, such as migratory acid-modified starches, as well as alkylated starches, e.g., ethylated starches, that are not gelatinized, etc., which have hot water viscosities below about 20 BU or above 300 BU, or which have peak viscosities below 120 Brabender Units or above 1000 Brabender Units. The combination of starches may be pre-mixed (e.g., in a dry mix, optionally with other components such as stucco, etc., or in a wet mix with other wet ingredients) before addition to the stucco slurry, or they can be included in the stucco slurry one at a time, or any variation thereof. Any suitable proportion of uncooked starch having the desired hot water and/or peak viscosity characteristic and other starch may be included. For example, the content of uncooked starch having the desired hot water and/or peak viscosity characteristic as a percentage of total starch content to be added to stucco slurry can be, e.g., at least about 10% by weight, such as at least about 20%, at least about 30%, at least about 40%, at least about 50%, at least about 60%, at least about 70%, at least about 80%, at least about 90%, at least about 95%, at least about 99%, at least about 100%, or any range in between). In exemplary embodiments, the ratio of uncooked starch having the desired hot water and/or peak viscosity characteristic to other starch can be about 25:75, about 30:70, about 35:65, about 50:50, about 65:35, about 70:30, about 75:25, etc.

In addition to the starch component, the slurry is formulated to include water, stucco, foaming agent (sometimes referred to simply as "foam"), and other additives as desired. The stucco can be in the form of calcium sulfate alpha hemihydrate, and/or calcium sulfate beta hemihydrate. In some embodiments, the beta form is preferred. The stucco can be fibrous or non-fibrous. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 µm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, about 0.7:1 to about 9:1, about 0.8:1 to about 9:1, about 1.4:1 to about 9:1, about 1.8:1 to about 9:1, about 2.3:1 to about 9:1, about 0.7:1 to about 6:1, about 1.4:1 to about 6:1, about 1.8:1 to about 6:1, about 0.7:1 to about 4:1, about 1.4:1 to about 4:1, about 1.8:1 to about 4:1, about 0.5:1 to about 2.3:1, about 0.7:1 to about 2.3:1, about 0.8:1 to about 2.3:1, about 1.4:1 to about 2.3:1, about 1.8:1 to about 2.3:1, etc. In some embodiments, the foaming agent is present in the slurry, e.g., in an amount of less than about 0.5% by weight of the stucco such as about 0.01% to about 0.5%, about 0.01% to about 0.4%, about 0.01% to about 0.3%, about 0.01% to about 0.2%, about 0.01% to about 0.1%, about 0.02% to about 0.4%, about 0.02% to about 0.3%, about 0.02% to about 0.2%, etc.

Additives such as accelerator (e.g., wet gypsum accelerator, heat resistant accelerator, climate stabilized accelerator) and retarder are well known and can be included if desired. See, e.g., U.S. Pat. Nos. 3,573,947 and 6,409,825.

In some embodiments, the rate of hydration is adjusted to avoid certain defects in the board manufacturing process, including blisters and delamination of the core-cover sheet bond, e.g., prior to driving off excess water in a kiln. Rate of hydration can be measured by the amount of time required to reach 50% hydration (referred to simply as "50% hydration") in minutes. It has been found that, in accordance with preferred embodiments, a desired 50% hydration time is selected for effective cutting of a ribbon of the setting stucco slurry into desired segments at a knife prior to entry of the segments into a kiln, followed by further processing to form a board with its final dimensions, and to avoid defects such as blisters, delamination, etc. It has been found that, surprisingly and unexpectedly, by adjusting the rate of hydration (e.g., by tailoring the amount of accelerator and/or retarder in the stucco slurry), onset of board defects such as blisters, peeling, delamination, and/or poor bond between a gypsum layer in the board and a cover sheet, can be reduced or avoided. While not wishing to be bound by any particular theory, uncooked starch does not contain as much contaminant as may be found in pregelatinized starch. The lower contaminant content in uncooked starch results in less retardive effect on the stucco setting process during preparation of board. Without wishing to be bound by any particular theory, when the rate of hydration is too fast, the board is susceptible to creation of certain defects such as peeling, blisters, etc. Since uncooked starch imparts less of a retardive effect than is provided by pregelatinized starch, it has been found that less accelerator should be used in the stucco slurry when uncooked starch is used in the stucco slurry.

As will be appreciated by one of ordinary skill in the art, the precise amount of accelerator varies among different manufacturing conditions due to differences in environmental conditions, the quality and purity of gypsum, etc. The accelerator content in the stucco slurry can be reduced by any suitable amount depending on the conditions at a particular facility. In some embodiments the amount of accelerator may be reduced by about 40% or less in a stucco slurry containing uncooked starch, as compared with the amount of accelerator used in a stucco slurry containing pregelatinized starch but is otherwise the same. For example, the amount of accelerator may be reduced in a stucco slurry containing uncooked starch (as compared with the same slurry using pregelatinized starch instead of uncooked starch) by about 1% to about 40%, e.g., from about 1% to about 35%, from about 1% to about 30%, from about 1% to about 25%, from about 1% to about 23%, from about 1% to about 20%, from about 1% to about 15%, from about 5% to about 40%, from about 5% to about 35%, from about 5% to about 30%, from about 5% to about 25%, from about 5% to about 23%, from about 5% to about 20%, from about 5% to about 15%, from about 10% to about 40%, from about 10% to about 35%, from about 10% to about 30%, from about 10% to about 25%, from about 10% to about 23%, from about 10% to about 20%, from about 10% to about 15%, from about 15% to about 40%, from about 15% to about 35%, from about 15% to about 30%, from about 15% to about 25%, from about 15% to about 20%, from about 20% to about 40%, from about 20% to about 35%, from about 20% to about 30%, from about 20% to about 25%.

As will be appreciated by one of ordinary skill in the art, the amount of accelerator and/or retarder used to achieve such desired hydration rates will vary due to different conditions at different manufacturing conditions (e.g., gypsum purity and quality, etc., which may vary at different manufacturing or research facilities). In some embodiments, the accelerator (e.g., a heat resistant accelerator) can be included in the stucco slurry in an amount of from about 0.5% to about 4% by weight of the stucco, e.g., from about 1% to about 2% by weight of the stucco.

In some embodiments where accelerator and/or retarder are included, the accelerator and/or retarder each can be in the stucco slurry in an amount on a solid basis of, e.g., from about 0% to about 5% by weight of the stucco (e.g., about 0.1% to about 3%), such as, for example, from about 0% to about 1% by weight of the stucco (e.g., about 0.01% to about 0.08%). Other additives as desired may be included, e.g., to impart strength to enable lower weight product with sufficient strength, to avoid permanent deformation, to promote green strength, e.g., as the product is setting on the conveyor traveling down a manufacturing line, to promote fire resistance, to promote water resistance, etc.

For example, the slurry can optionally include at least one dispersant to enhance fluidity in some embodiments. Like the starch and other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present invention is Maraspserse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another exemplary naphthalenesulfonate is DAXAD, available from Hampshire Chemical Corp.

If included, the dispersant can be included in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, etc.

One or more phosphate-containing compounds can also be optionally included in the slurry, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate-containing components in accordance with some embodiments of the invention can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphate can be included in a dry form or in a form in water (e.g., a phosphate solution from about 5% to about 20%, such as about a 10% solution). If included, the phosphate can be in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco.

Suitable additives for fire-rated and/or water resistant product can also optionally be included, including e.g., siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). See, e.g., co-pending, commonly assigned U.S. application Ser. No. 13/400,010 (filed Feb. 17, 2012) for description of these and other ingredients. In some embodiments, high expansion vermiculite is included, although other fire resistant materials can be included. The board of some fire-related product according to the invention can have a Thermal Insulation Index (TI) of about 17 minutes or greater, e.g., about 20 minutes or greater, about 30 minutes or greater, about 45 minutes or greater, about 60 minutes or greater, etc.; and/or a High Temperature Shrinkage (at temperatures of about 1560° F. (850° C.)) of less than about 10% in the x-y directions and expansion in the z-direction of at least about 2%, such as at least about 5%, at least about 10%, at least about 15%, or at least about 20%. The fire or water resistance additives can be included in any suitable amount as desired depending, e.g., on fire rating, etc. For example, if included, the fire or water resistance additives can be in an amount from about 0.5% to about 10% by weight of the stucco, such as from about 1% to about 10%, about 1% to about 8%, about 2% to about 10%, about 2% to about 8% by weight of the stucco, etc.

If included, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the stucco slurry. In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that about 0.3% to about 1.0% of the BS 94 siloxane may be used in some embodiments, based on the weight of the dry ingredients. For example, in some embodiments, it is preferred to use from about 0.4% to about 0.8% of the siloxane based on the dry stucco weight.

The slurry formulation can be made with any suitable water/stucco ratio, e.g., about 0.4 to about 1.3. However, because the uncooked starches having the hot water viscosity and/or peak viscosity characteristic of the invention reduce the amount of water required to be added to the slurry to accommodate them, as compared with other starches, the slurry can be formulated with a water/stucco ratio input that is lower in some embodiments than what is conventional for other starch-containing gypsum slurries, especially at low weight/density. For example, in some embodiments, the water/stucco ratio can be from about 0.4 to about 1.2, about 0.4 to about 1.1, about 0.4 to about 1, about 0.4 to about 0.9, about 0.4 to about 0.85, about 0.45 to about 0.85, about 0.55 to about 0.85, about 0.55 to about 0.8, about 0.6 to about 0.9, about 0.6 to about 0.85, about 0.6 to about 0.8, etc.

The cover sheets can be formed of any suitable material and basis weight. Advantageously, board core formed from slurry comprising uncooked starch characterized by hot water viscosity and/or peak viscosity provides sufficient strength in board even with lower basis weight cover sheets such as, for example, less than 45 lbs/MSF (e.g., about 33 lbs/MSF to 45 lbs/MSF) even for lower weight board (e.g., having a density of about 35 pcf or below) in some embodiments. However, if desired, in some embodiments, heavier basis weights can be used, e.g., to further enhance nail pull resistance or to enhance handling, e.g., to facilitate desirable "feel" characteristics for end-users. In some embodiments, to enhance strength (e.g., nail pull strength), especially for lower density board, one or both of the cover sheets can be formed from paper and have a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, etc.). If desired, in some embodiments, one cover sheet (e.g., the "face" paper side when installed) can have aforementioned higher basis weight, e.g., to enhance nail pull resistance and handling, while the other cover sheet (e.g., the "back" sheet when the board is installed) can have somewhat lower weight basis if desired (e.g., weight basis of less than 45 lbs/MSF, e.g., from about 33 lbs/MSF to 45 lbs/MSF (e.g., about 33 lbs/MSF to about 40 lbs/MSF).

Board weight is a function of thickness. Since boards are commonly made at varying thickness, board density is used herein as a measure of board weight. The advantages of the uncooked hot water viscosity and/or peak viscosity starch in accordance with embodiments of the invention can be seen across various board densities, e.g., about 40 pcf or less, such as from about 10 pcf to about 40 pcf, from about 12 pcf to about 40 pcf, from about 16 pcf to about 35 pcf, from about 20 pcf to about 40 pcf, from about 24 pcf to about 37 pcf, etc. However, preferred embodiments of the invention have particular utility at lower densities where the enhanced strength provided by the uncooked hot water viscosity and/or peak viscosity starches of the invention advantageously enable the production of lower weight board with good strength and lower water demand than board made from other starches. For example, in some embodiments, board density can be, e.g. from about 12 pcf to about 35 pcf, from about 12 pcf to about 30 pcf, from about 12 pcf to about 27 pcf, from about 16 pcf to about 30 pcf, from about 16 pcf to about 27 pcf, from about 16 pcf to about 24 pcf, from about 18 pcf to about 30 pcf, from about 18 pcf to about 27 pcf, from about 20 pcf to about 30 pcf, from about 20 pcf to about 27 pcf, from about 24 pcf to about 35 pcf, from about 27 pcf to about 35 pcf, from about 27 pcf to about 34 pcf, from about 30 pcf to about 34 pcf, about 27 pcf to about 30 pcf, etc.

The uncooked starches having the desired hot water and/or peak viscosity characteristic of the invention provide strength enhancement to product according to the invention, which can be especially beneficial at lower weight/density. For example, in some embodiments, board core or other slurry cast according to the 2 inch cube test (without foam), as described in U.S. Patent Application Publication 2014/0113124, preferably exhibit a compressive strength of at least about 1100 psi, e.g., at least about 1200 psi, at least about 1500 psi, at least about 1900 psi, at least about 1950 psi, at least about 2000 psi, at least about 2050 psi, at least about 2100 psi, at least about 2150 psi, at least about 2200 psi, at least about 2250 psi, at least about 2300 psi, at least about 2350 psi, etc. Such wet compressive strengths are desired to reduce or prevent damage during manufacturing steps prior to drying the board, e.g., in a kiln. In addition, board according to some embodiments of the invention have good wet compressive strength (e.g., better than board formed from a slurry containing pregelatinized starch). For example, in some embodiments, the board can a have wet compression strength of at least about 150 psi (e.g., at least about 170 psi) three minutes after casting begins (e.g., when the slurry is deposited onto paper on a manufacturing line); at least about 460 psi five minutes after casting begins (e.g., at least about 500 psi or at least about 520 psi); greater than 580 psi seven minutes after casting begins; and/or at least about 590 psi ten minutes after casting begins.

In some embodiments, board according to the invention meets test protocols according to ASTM Standard C473-10, method B. For example, in some embodiments, when the board is cast at a thickness of ½ inch, the board has a nail pull resistance of at least about 65 lb as determined according to ASTM C 473, method B (e.g., at least about 68 lb, at least about 70 lb, at least about 72 lb, at least about 75 lb, at least about 77 lb, etc.). With respect to flexural strength, in some embodiments, when cast in a board of ½ inch thickness, the board has a flexural strength of at least about 36 lb in a machine direction (e.g., at least about 38 lb, at least about 40 lb, etc.) and/or at least about 107 lb (e.g., at least about 110 lb, at least about 112 lb, etc.) in a cross-machine direction as determined according to the ASTM standard C473. In addition, in some embodiments, board can have an average core hardness of at least about 11 pounds as determined according to ASTM C-473-10 method B. Due at least in part to the hot water viscosity and/or peak viscosity characteristic of embodiments of the invention, these standards can be met even with respect to lower density board (e.g., about 35 pcf or less) as described herein.

Product according to embodiments of the invention can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the stucco slurry are fed to a mixer (e.g., pin mixer), where they are agitated to form the stucco slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S.

Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1.

Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary stucco slurry and will form the board core. This board core slurry is discharged onto the moving face coversheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary stucco slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a precursor to the final product. The second cover sheet may optionally bear a second skim coat, which can be formed from the same or different secondary (dense) stucco slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). It also is common in the manufacture of gypsum board to use vibration in order to eliminate large voids or air pockets from the deposited slurry. Each of the above steps, as well as processes and equipment for performing such steps, are known in the art.

The uncooked starch characterized by hot water and/or peak viscosity of the invention can be used in formulating various products, such as, for example, gypsum wallboard, acoustical (e.g., ceiling) tile, gypsum-cellulosic fiber products, such as gypsum-wood fiber wallboard, and the like. In some embodiments, such product can be formed from slurry according to embodiments of the invention.

As such, the uncooked starch characterized by desired hot water and/or peak viscosity can have beneficial effect, as described herein, in product besides paper-faced gypsum board in embodiments of the invention. For example, uncooked starch characterized as having a hot water and/or peak viscosity can be used in mat-faced products (e.g., woven) where board cover sheets are in the form of fibrous mats. The mats can optionally bear a finish to reduce water permeability. Other ingredients that can be included in making such mat-faced product, as well as materials for the fibrous mats and methods of manufacture, are discussed in, e.g., U.S. Pat. No. 8,070,895, as well as U.S. Patent Application Publication 2009/0247937.

In addition, gypsum-cellulosic product can be in the form of cellulosic host particles (e.g., wood fibers), gypsum, uncooked starch of hot water and/or peak viscosity, and other ingredients (e.g., water resistant additives such as siloxanes) as desired. Other ingredients and methods of manufacture are discussed in, e.g., U.S. Pat. Nos. 4,328,178; 4,239,716; 4,392,896; 4,645,548; 5,320,677; 5,817,262; and 7,413,603.

The uncooked starch characterized by hot water and/or peak viscosity according to embodiments of the invention also can be used in various types of acoustical panels (e.g., ceiling tile). The starch can be mixed with calcined gypsum, water, and other ingredients as desired in some embodiments. However, the uncooked starch of hot water and/or peak viscosity in accordance with some embodiments is not limited to use with calcined gypsum. The uncooked starch of hot water and/or peak viscosity in accordance with some embodiments can provide good bond between starch and non-setting components such as fibers (e.g., mineral wool and the like). In some embodiments, the panel has a Noise Reduction Coefficient of at least about 0.5 (e.g., at least about 0.7 or at least about 1) according to ASTM C 423-02. See, e.g., U.S. Pat. Nos. 1,769,519; 6,443,258; 7,364,015; 7,851,057; and 7,862,687 for discussion of ingredients and methods for making acoustical tile.

The invention is further illustrated by the following exemplary embodiments. However, the invention is not limited by the following embodiments.

(1) A gypsum board, slurry, or method for making gypsum board as described herein.

(2) A gypsum board comprising: a set gypsum core disposed between two cover sheets, the core formed from a slurry comprising stucco, water, and at least one uncooked corn starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(3) The gypsum board of embodiment 2, wherein the uncooked starch has a bulk density of from about 41 pcf to about 45 pcf.

(4) The gypsum board of any one of embodiments 2-3, wherein the uncooked starch has a peak viscosity of from about 120 BU to about 875 BU.

(5) The gypsum board of embodiment 4, wherein the uncooked starch has a peak viscosity of from about 300 BU to about 875 BU.

(6) The gypsum board of embodiment 5, wherein the uncooked starch has a peak viscosity of from about 400 BU to about 875 BU.

(7) The gypsum board of any one of embodiments 2-6, wherein the uncooked starch is acid-modified.

(8) The gypsum board of any one of embodiment 2-7, wherein the uncooked starch has a cold water viscosity of less than about 50 centipoise, as measured according to Brookfield viscometer method.

(9) The gypsum board of embodiment 8, wherein the uncooked starch has a cold water viscosity of about 1 centipoise to about 40 centipoise.

(10) The gypsum board of embodiment 8, wherein the uncooked starch has a cold water viscosity of about 1 centipoise to about 20 centipoise.

(11) The gypsum board of any one of embodiments 1-10, wherein the slurry further comprises a dispersant.

(12) The gypsum board of embodiment 11, wherein the dispersant is naphthalene sulfonate.

(13) The gypsum board of embodiments 11 or 12, wherein the dispersant is present in an amount of from about 0.1 to about 4% by weight of the stucco.

(14) The gypsum board of any one of embodiments 1-13, wherein the slurry further comprises a polyphosphate.

(15) The gypsum board of embodiment 14, wherein the polyphosphate is sodium trimetaphosphate.

(16) The gypsum board of embodiments 14 or 15, wherein the polyphosphate is present in an amount of from about 0.1 to about 0.3% by weight of the stucco.

(17) The gypsum board of any one of embodiments 1-16, wherein the board has a density of from about 16 pcf to about 35 pcf.

(18) The gypsum board of embodiment 17, wherein the board has a density of from about 20 pcf to about 31 pcf.

(19) The gypsum board of any one of embodiments 1-18, wherein the board has a nail pull resistance of at least about 72 lb-f according to ASTM 473-10, method B.

(20) A gypsum board comprising: a set gypsum core disposed between two cover sheets, the core formed from a slurry comprising stucco, water, and at least one uncooked starch having a cold water viscosity at 10% of solids of from about 5 centipoise to about 50 centipoise when the viscosity is measured by a Brookfield viscometer method at 25° C.

(21) The gypsum board of embodiment 20, wherein the uncooked starch has a bulk density of from about 41 pcf to about 45 pcf.

(22) The gypsum board of either of embodiments 20 or 21, wherein the uncooked starch has a peak viscosity of from about 120 BU to about 1000 BU.

(23) The gypsum board of embodiment 22, wherein the uncooked starch has a viscosity of from about 300 BU to about 875 BU.

(24) The gypsum board of embodiment 23, wherein the uncooked starch has a viscosity of from about 400 BU to about 875 BU.

(25) The gypsum board of any one of embodiments 20-24, wherein the uncooked starch is acid-modified.

(26) The gypsum board of any one of embodiments 20-25, wherein the uncooked starch has a cold water viscosity of less than about 50 centipoise, as measured according to a Brookfield viscometer method.

(27) The gypsum board of embodiment 26, wherein the uncooked starch has a cold water viscosity of about 1 centipoise to about 40 centipoise.

(28) The gypsum board of embodiment 27, wherein the uncooked starch has a cold water viscosity of about 1 centipoise to about 20 centipoise.

(29) The gypsum board of any one of embodiments 20-28, wherein the slurry further comprises a dispersant.

(30) The gypsum board of embodiment 29, wherein the dispersant is naphthalene sulfonate.

(31) The gypsum board of embodiments 29 or 30, wherein the dispersant is present in an amount of from about 0.1 to about 5% by weight of the stucco.

(32) The gypsum board of any one of embodiments 20-31, wherein the slurry further comprises a polyphosphate.

(33) The gypsum board of embodiment 32, wherein the polyphosphate is sodium trimetaphosphate.

(34) The gypsum board of embodiments 32 or 33, wherein the polyphosphate is present in an amount of from about 0.1% to about 0.3% by weight of the stucco.

(35) The gypsum board of any one of embodiments 20-34, wherein the board has a density of from about 16 pcf to about 35 pcf.

(36) The gypsum board of embodiments 35, wherein the board has a density of from about 20 pcf to about 31 pcf.

(37) The gypsum board of any one of embodiments 20-36, wherein the board has a nail pull resistance of at least about 72 lb-f according to ASTM 473-10, method B.

(38) A slurry comprising stucco, water, and at least one uncooked starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(39) A slurry comprising stucco, water, and at least one uncooked starch having a cold water viscosity of from about 5 centipoise to about 50 centipoise when the viscosity is measured by a Brookfield viscometer method at 25° C.

(40) The slurry of either of embodiments 38 or 39, wherein the uncooked starch has a bulk density of from about 41 pcf to about 45 pcf.

(41) The slurry of any one of embodiments 38-40, wherein the uncooked starch has a peak viscosity of from about 120 BU to about 875 BU.

(42) The slurry of embodiment 41, wherein the uncooked starch has a viscosity of from about 300 BU to about 875 BU.

(43) The slurry of embodiment 42, wherein the uncooked starch has a viscosity of from about 400 BU to about 875 BU.

(44) The slurry of any one of embodiments 38-43, wherein the uncooked starch is acid-modified.

(45) The slurry of embodiment 38, wherein the uncooked starch has a cold water viscosity of less than about 50 centipoise, as measured according to a Brookfield viscometer method.

(46) The slurry of any one of embodiments 38-45, wherein the uncooked starch has a cold water viscosity of about 1 centipoise to about 40 centipoise.

(47) The slurry of claim 46, wherein the uncooked starch has a cold water viscosity of about 1 centipoise to about 20 centipoise.

(48) The slurry of any one of embodiments 38-47, wherein the slurry further comprises a dispersant.

(49) The slurry of embodiment 48, wherein the dispersant is naphthalene sulfonate.

(50) The slurry of embodiments 48 or 49, wherein the dispersant is present in an amount of from about 0.1% to about 5% by weight of the stucco.

(51) The slurry of any one of embodiments 38-50, wherein the slurry further comprises a polyphosphate.

(52) The slurry of embodiment 51, wherein the polyphosphate is sodium trimetaphosphate.

(53) The slurry of embodiments 51 or 52, wherein the polyphosphate is present in an amount of from about 0.1% to about 0.3% by weight of the stucco.

(54) The slurry of any one of embodiments 38-53, the slurry having a water-stucco ratio of from about 0.4 to about 1.2.

(55) The slurry of any one of embodiments 38-54, wherein, when the slurry is prepared into a board, the board has a density of from about 16 pcf to about 35 pcf and a nail pull resistance of at least about 65 lb-f according to ASTM 473-10, method B.

(56) A product made from the slurry of any of embodiments 38-55.

(57) A method of preparing gypsum board comprising: (a) mixing a slurry of any one of embodiments 38-56; (b) disposing the slurry between a first cover sheet and a second cover sheet to form a wet assembly; (c) cutting the wet assembly into a board; and (d) drying the board.

(58) An acoustical panel comprising an acoustical component comprising fiber and at least one uncooked starch having a peak viscosity of from about 120 Brabender Units to about 1000 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute, and wherein the panel has a Noise Reduction Coefficient of at least about 0.5 according to ASTM C 423-02.

(59) The acoustical panel according to embodiment 58, wherein the fibers comprise mineral wool.

(60) A gypsum board comprising: a set gypsum core disposed between two cover sheets, the core formed from a slurry comprising stucco, water, and at least one uncooked corn starch having a hot water viscosity of from about 20 Brabender Units to about 300 Brabender Units when the viscosity is measured by the HWVA method.

(61) The gypsum board of embodiment 60, wherein the uncooked starch has a bulk density of from about 35 pcf to about 45 pcf.

(62) The gypsum board of embodiment 60, wherein the uncooked starch has a bulk density of from about 41 pcf to about 45 pcf.

(63) The gypsum board of any one of embodiments 60-62, wherein the uncooked starch has a peak viscosity of from about 120 BU to about 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(64) The gypsum board of embodiment 63, wherein the uncooked starch has a peak viscosity of from about 300 BU to about 875 BU.

(65) The gypsum board of any one of embodiments 60-64, wherein the uncooked starch has a hot water viscosity of from about 30 BU to about 200 BU.

(66) The gypsum board of any one of embodiments 60-65, wherein the uncooked starch is acid-modified.

(67) The gypsum board of any one of embodiments 60-66, wherein the uncooked starch has a cold water viscosity of less than about 50 centipoise at 10% solids, as measured according to Brookfield viscometer method.

(68) The gypsum board of embodiment 67, wherein the uncooked starch has a cold water viscosity of about 1 centipoise to about 40 centipoise.

(69) The gypsum board of embodiment 67, wherein the uncooked starch has a cold water viscosity of about 1 centipoise to about 20 centipoise.

(70) The gypsum board of any one of embodiments 60-69, wherein the slurry further comprises a dispersant.

(71) The gypsum board of embodiment 70, wherein the dispersant is naphthalene sulfonate.

(72) The gypsum board of embodiments 70 or 71, wherein the dispersant is present in an amount of from about 0.1 to about 4% by weight of the stucco.

(73) The gypsum board of any one of embodiments 60-72, wherein the slurry further comprises a polyphosphate.

(74) The gypsum board of embodiment 73, wherein the polyphosphate is sodium trimetaphosphate, and the slurry further comprises a dispersant.

(75) The gypsum board of embodiment 74, wherein the polyphosphate is sodium trimetaphosphate.

(76) The gypsum board of embodiments 74 or 75, wherein the polyphosphate is present in an amount of from about 0.1 to about 0.3% by weight of the stucco.

(77) The gypsum board of any one of embodiments 60-76, wherein the board has a density of from about 16 pcf to about 35 pcf.

(78) The gypsum board of embodiment 77, wherein the board has a density of from about 20 pcf to about 31 pcf.

(79) The gypsum board of any one of embodiments 60-78, wherein the board has a nail pull resistance of at least about 72 lb-f according to ASTM 473-10, method B.

(80) The gypsum board of any one of embodiments 60-79, wherein the uncooked starch is tapioca starch, wheat starch, potato starch, and/or corn starch.

(81) The gypsum board of any one of embodiments 60-80, wherein the uncooked starch has a hot water viscosity of from about 30 BU to about 200 BU.

(82) The gypsum board of any one of embodiments 60-81, wherein the uncooked starch has a bulk density of from about 35 pcf to about 45 pcf, the uncooked starch is acid-modified, the uncooked starch has a cold water viscosity of less than about 50 centipoise at 10% solids, as measured according to the Brookfield viscometer method, and the board has a density of from about 16 pcf to about 35 pcf.

(83) The gypsum board of any one of embodiments 60-82, the uncooked starch having a cold water viscosity at 10% of solids of from about 5 centipoise to about 50 centipoise when the viscosity is measured by a Brookfield viscometer method at 25° C., and a peak viscosity of from about 120 BU to about 1000 BU, when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(84) The gypsum board of embodiment 83, wherein the uncooked starch has a cold water viscosity of from about 1 centipoise to about 20 centipoise, and the board has a density of from about 16 pcf to about 35 pcf.

(85) A slurry comprising stucco, water, and at least one uncooked starch having a hot water viscosity of from about 20 Brabender Units to about 300 Brabender Units when the viscosity is measured by the HWVA method.

(86) The slurry of embodiment 85, wherein the uncooked starch has a bulk density of from about 41 pcf to about 45 pcf.

(87) The slurry of either of embodiments 85 or 86, wherein the uncooked starch has a peak viscosity of from about 120 BU to about 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(88) The slurry of embodiment 87, wherein the uncooked starch has a hot water viscosity of from about 30 BU to about 200 BU.

(89) The slurry of any one of embodiments 85-88, wherein the uncooked starch is acid-modified.

(90) The slurry of embodiment 85, wherein the uncooked starch has a cold water viscosity of less than about 50 centipoise, as measured according to a Brookfield viscometer method.

(91) The slurry of any one of embodiments 85-90, wherein the uncooked starch has a cold water viscosity of about 1 centipoise to about 40 centipoise.

(92) The slurry of embodiment 91, wherein the uncooked starch has a cold water viscosity of about 1 centipoise to about 20 centipoise.

(93) The slurry of any one of embodiments 85-92, wherein the slurry further comprises a dispersant.

(94) The slurry of embodiment 93, wherein the dispersant is naphthalene sulfonate.

(95) The slurry of embodiments 93 or 94, wherein the dispersant is present in an amount of from about 0.1% to about 5% by weight of the stucco.

(96) The slurry of any one of embodiments 85-95, wherein the slurry further comprises a polyphosphate.

(97) The slurry of embodiment 96, wherein the polyphosphate is sodium trimetaphosphate.

(98) The slurry of embodiments 96 or 97, wherein the polyphosphate is present in an amount of from about 0.1% to about 0.3% by weight of the stucco.

(99) The slurry of any one of embodiments 85-98, the slurry having a water-stucco ratio of from about 0.4 to about 1.2.

(100) The slurry of any one of embodiments 85-99, wherein, when the slurry is prepared into a board, the board has a density of from about 16 pcf to about 35 pcf and a nail pull resistance of at least about 65 lb-f according to ASTM 473-10, method B.

(101) The slurry of any one of embodiments 85-100, wherein the uncooked starch is tapioca starch, wheat starch, potato starch, and/or cornstarch.

(102) The slurry of any one of embodiments 85-101, wherein the slurry further comprises a dispersant, and a polyphosphate.

(103) The slurry of any one of embodiments 85-102, wherein the uncooked starch has a peak viscosity of from about 120 BU to about 1000 BU when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(104) A product made from the slurry of any of embodiments 85-103.

(105) A method of preparing gypsum board comprising: (a) mixing a slurry of any one of embodiments 85-104; (b) disposing the slurry between a first cover sheet and a second cover sheet to form a wet assembly; (c) cutting the wet assembly into a board; and (d) drying the board.

(106) The method of embodiment 105, wherein the uncooked starch has a cold water viscosity of less than about 50 centipoise at 10% solids, as measured according to the Brookfield viscometer method.

(107) The method of embodiment 106, wherein the uncooked starch is tapioca starch, wheat starch, potato starch, and/or corn starch.

(108) An acoustical panel comprising an acoustical component comprising fiber and at least one uncooked starch having a hot water viscosity of from about 20 Brabender Units to about 300 Brabender Units when the viscosity is measured by the HWVA method, and wherein the panel has a Noise Reduction Coefficient of at least about 0.5 according to ASTM C 423-02.

(109) The acoustical panel according to embodiment 108, wherein the fibers comprise mineral wool.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

Table 1 compares the cold water viscosity of uncooked starches A and B (Clinton 277 and Clinton 260, respectively) and pregelatinized starches A and B. Pregelatinized starch A is a pregelatinized corn starch having a viscosity of 773 centipoise according to the VMA method, and pregelatinized starch B is a pregelatinized corn starch having a viscosity of 100 centipoise according to the VMA method.

TABLE 1

Brookfield viscosity of a 10% of starch slurries at 25° C.

| Starch | Viscosity (Centipoise) |
| --- | --- |
| Pregelatinized corn starch A | 396 |
| Pregelatinized corn starch B | 92 |
| Uncooked acid-modified corn starch A (Clinton 277) | 9.5 |
| Uncooked acid-modified corn starch B (Clinton 260) | 9.3 |

Table 2 shows the peak viscosity of uncooked acid-modified corn starches A-C.

TABLE 2

Brabender peak viscosity of a 15% of starch slurries

| Type of Starch | Product Name | Peak Viscosity (BU) |
| --- | --- | --- |
| Uncooked acid-modified corn starch A | Clinton 277 | 141 |
| Uncooked acid-modified corn starch B | Clinton 260 | 451 |
| Uncooked acid-modified corn starch C | Clinton 240 | 872 |

The viscosity of uncooked acid-modified corn starches A-C was measured by putting the starch in a slurry with water at a starch concentration of 15% solids, and using a Viscograph-E instrument set at 75 rpm and 700 cmg, where the starch was heated from 25° C. to 95° C. at a rate of 3° C./minute, the slurry was held at 95° C. for ten minutes, and the starch was cooled to 50° C. at a rate of −3° C./minute. The maximal viscosity was recorded as the peak viscosity. FIG. 1 is a Brabender amylogram of slurries of 15% starch in water, illustrating the viscosity of uncooked acid-modified corn starches A-C, as outlined in Table 2.

In FIG. 1, the X-axis is time and the Y-axis superimposes viscosity (primary Y-axis, on the left) and temperature (secondary Y-axis, on the right).

Table 3 shows the composition used in forming no-foam gypsum disk samples. The retarder was in the form of a 1% solution of the pentasodium salt of diethylenetriaminepentaacetic acid (Versenex™ 80, commercially available from DOW Chemical Company, Midland, Mich.). The dispersant was in the form of polynaphthalene sulfonate (DILOFLO, commercially available from GEO Specialty Chemicals, Amber, Pa.). The disk sample was wrapped in an aluminum foil and heated at 350° F. for 22 min, then was dried at 110° F. overnight.

TABLE 3

Composition of no-foam gypsum disk samples

| | Composition A (comparative) | Composition B | Composition C |
|---|---|---|---|
| Stucco | 300 g | 300 g | 300 g |
| Heat Resistant Accelerator | 3 g | 3 g | 3 g |
| Starch | 6 g (pregelatinized corn starch A) | 6 g (Uncooked acid-modified corn starch C, Clinton 240) | 6 g (Uncooked acid-modified corn starch A, Clinton 277) |
| Sodium trimetaphosphate | 0.6 g | 0.6 g | 0.6 g |
| Retarder | 0.15 g | 0.15 g | 0.15 g |
| Dispersant | 1.5 g | 1.5 g | 1.5 g |
| Water | 448.5 g | 448.5 g | 448.5 g |

Table 4 shows compressive strength of no-foam gypsum samples with uncooked acid-modified corn starches C and A (Clinton 240 and Clinton 277, respectively) and pregelatinized corn starch A (comparative).

TABLE 4

Compressive strength of no-foam gypsum disk samples at a density of 39 pcf

| | Compressive strength (psi) |
|---|---|
| Composition A | 1018 |
| Composition B | 1218 |
| Composition C | 1157 |

Table 5 shows the composition of foamed gypsum disk samples. Foam (0.5% soap solution with a ratio of unstable:stable soap of 1:1) was added to bring the final density to 30 pcf. The retarder was in the form of a 1% solution of the pentasodium salt of diethylenetriaminepentaacetic acid (Versenex™ 80). The dispersant was in the form of polynaphthalene sulfonate (DILOFLO). The slurry was poured into a 1 foot×1 foot paper envelope and heated at 350° F. for 22 min, then was dried at 110° F. overnight.

TABLE 5

Composition of foamed gypsum disk samples

| | Composition D (Comparative) | Composition E |
|---|---|---|
| Stucco | 600 g | 600 g |
| Heat Resistant Accelerator | 6 g | 6 g |
| Starch | 12 g (pregelatinized corn starch A) | 12 g (Uncooked acid-modified corn starch C, Clinton 240) |
| Sodium trimetaphosphate | 1.2 g | 1.2 g |
| Retarder | 0.15 g | 0.15 g |
| Dispersant | 3 g | 3 g |
| Water | 512 g | 481 g |

Table 6 shows compressive strength and nail pull strength of foamed gypsum samples with uncooked acid-modified corn starch C (Clinton 240) as compared with pregelatinized starch A.

TABLE 6

Compressive strength and nail pull strength of foamed gypsum disk samples

| | Density (pcf) | Compressive strength (psi) | Nail pull strength (lbs) |
|---|---|---|---|
| Composition D | 30.1 | 357 | 68.5 |
| Composition E | 30.6 | 421 | 78.1 |

As seen in Tables 4 and 6, the strength provided by the uncooked starches was higher than that of pregelatinized starches.

Example 2

This Example illustrates the wet strength of an unfoamed set gypsum composition formed from a slurry containing an uncooked starch, as compared with two other set gypsum compositions formed from slurries containing pregelatinized starches. The wet strength was measured before the composition entered a kiln for drying. The wet strength of a gypsum board affects, e.g., how well the wet gypsum board is cut, and how well the wet gypsum board is flipped and transported from a knife to a kiln on a wallboard manufacturing line.

In particular, the wet strength was measured by a compressive strength test. The formulation for preparing the set gypsum compositions is listed in Table 7 with the only difference between the three compositions being the selection of the starch. One composition contained uncooked, acid modified corn starch B (i.e., Clinton 260) as compared with the other two compositions formed from pregelatinized corn starch A and B, respectively, where the starches are set forth in Tables 1 and 2.

TABLE 7

Formulation of stucco slurry for wet strength test

| Ingredient | Weight (g) | Weight (% by weight of stucco) |
|---|---|---|
| Stucco | 500 | 100 |
| Heat Resistant Accelerator | 5 | 1 |
| Starch | 8 | 1.6 |
| Sodium trimetaphosphate (10% solution) | 5 | 0.1 |
| PNS | 2.5 | 0.5 |
| Water | 542.5 | 108.5 |

The dry ingredients were mixed and added into the liquid ingredients. The mixture was soaked for 10 seconds, and mixed for 10 seconds in a Waring blender (model CB15N). The slurry was poured into a ring with a diameter of 4 inches and a thickness of ⅝ inch. The wet compressive strength of the set unfoamed gypsum disks was measured at 3, 5, 7, and 10 minutes after the dry ingredients were mixed with the liquid ingredients. The results are provided in FIG. 2.

Figure 2:
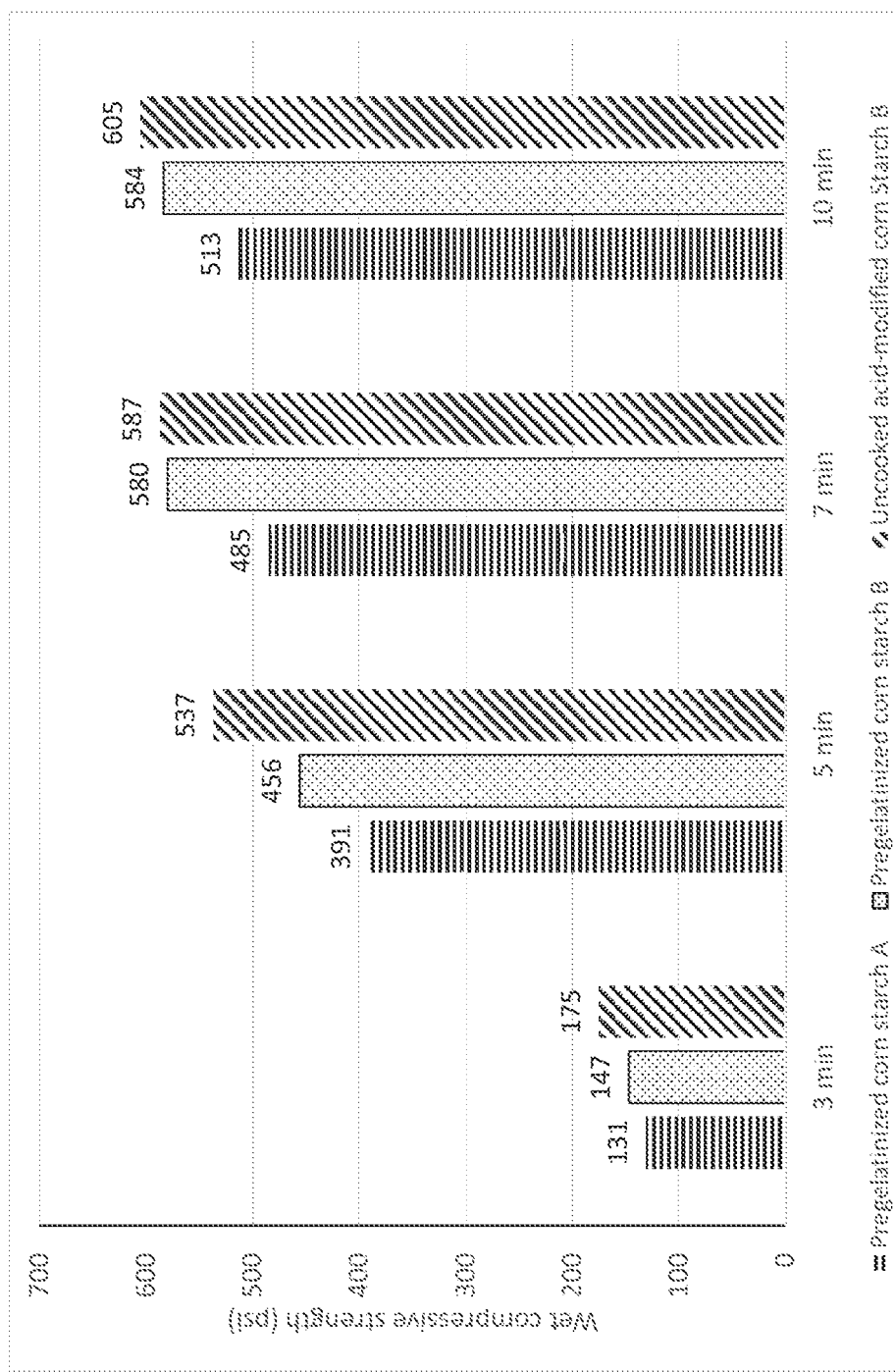
FIG. 2 is a bar graph of the wet compressive strength of a set gypsum composition formed from slurry containing uncooked acid-modified corn starch B, as compared with set gypsum compositions formed from slurries containing pregelatinized corn starches A and B, respectively, at intervals of three, five, seven, and ten minutes, as described in Example 2.

Surprisingly, as seen in FIG. 2, the sample containing uncooked acid-modified corn starch B (Clinton 260) had stronger wet strength than the samples containing pregelatinized corn starches A and B at all time intervals.

Example 3

This Example demonstrates the drying rate of wet boards formed from a slurry containing an uncooked starch as compared with the boards formed from a slurry containing a pregelatinized corn starch. In this respect, the drying rate can affect the board manufacturing process, including parameters such as energy usage, line speed, paper-core bond, end burn, kiln jam, etc.

In particular, two one foot by one foot gypsum boards were made according to the formulation listed in Table 8, with the only difference between the two board formulations being the type of starch included in the slurry. One board was formed from an uncooked acid-modified corn starch B, as shown in Tables 1 and 2, which was compared with the other board, formed from pregelatinized corn starch B as described in Table 1.

TABLE 8

Formulation of stucco slurry

| Ingredients | Weight (g) | Weight (% by weight of stucco) |
|---|---|---|
| Stucco | 700 | 100 |
| Heat Resistant Accelerator | 7 | 1 |
| Starch | 14 | 2 |
| Sodium Trimetaphosphate (10% solution) | 14 | 0.2 |
| PNS | 3.5 | 0.5 |
| Retarder (1% solution) | 25 | 0.036 |
| Gauging water | 600 | 85.7 |

"PNS" refers to polynaphthalene sulfonate (DILOFLO). The retarder was in the form of a 1% solution of the pentasodium salt of diethylenetriaminepentaacetic acid (Versenex™ 80). "Gauging" water refers to the water mixed with the dry ingredients. Dry ingredients (stucco, heat resistant accelerator, starch) were mixed and added into liquid ingredients (sodium trimetaphosphate 10% solution, dispersant, 1% retarder solution, and water). The mixture was soaked for 10 seconds, and mixed at speed 2 of a Hobart mixer (model N50) for 25 seconds. Air bubbles were made by mixing air and a 0.5% of a soap mixture (stable soap:unstable soap=1:1). The flow rate of air was 5 L/min and the flow rate of the soap solution was 25 lbs/hr. A dry core density of 31 pcf was reached after 15 seconds of foaming. The foamed slurry was poured between a face paper (Manila) and a back paper (Newsline). The thickness of the board was 0.5 inch. The set board was dried at 450° F. for 17 min. The weight of the boards over time is reported in FIG. 3.

Figure 3:
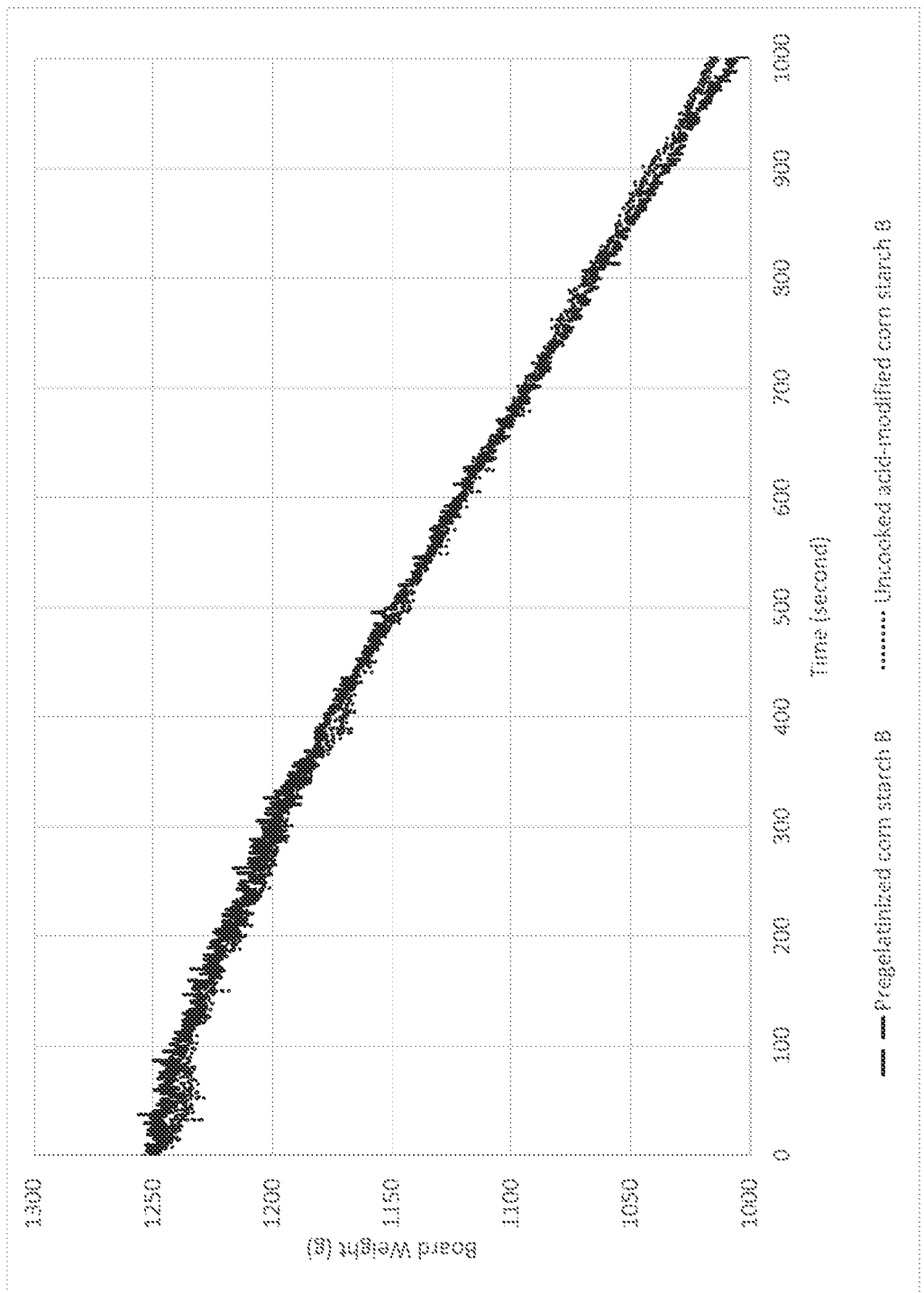
FIG. 3 is a graph of the drying rate (weight vs. time) at 450° F. of board formed from a slurry containing uncooked starch compared to board formed from a slurry containing pregelatinized corn starch B, as described in Example 3.

As seen in FIG. 3, uncooked starch (acid-modified corn starch B, i.e., Clinton 260) had a similar drying rate as the pregelatinized corn starch B, despite heat being used to gelatinize the uncooked starch in situ. No difference in drying rate of the boards made from these two starches was observed.

Example 4

This Example illustrates the Hot Water Viscosity Assay (HWVA) of starches. Uncooked acid-modified corn starch A (Clinton 277), uncooked acid-modified corn starch B (Clinton 260), uncooked acid-modified corn starch C (Clinton 240), uncooked acid-modified corn starch E (Clinton 220), and lab acid-modified corn starch D were compared with 15% of solids in a water slurry.

The test is performed using the following steps: Starch (60 g) in water (340 g) is formed into a slurry and transferred into a measuring bowl for a Brabender Amylograph. The slurry is heated from 25° C. to 92° C. and held at 92° C. for 10 min. The slurry is then cooled to 55° C. and held at 55° C. for 10 min. The hot water viscosity is determined when the 10 minute 92° C. period is completed.

Regarding Brabender Units, briefly, a C.W. Brabender Viscograph can be used, e.g., a Viscograph-E that uses reaction torque for dynamic measurement. The Viscograph-E is commercially available from C.W. Brabender Instruments, Inc., Hackensack, N.J. It is to be noted that, as defined herein, the Brabender units are measured using a sample cup size of 16 fl. oz (≈500 cc), with a 700 cmg cartridge at an RPM of 75. One of ordinary skill in the art also will readily recognize that the Brabender units can be converted to other viscosity measurements, such as centipoise (e.g., cP=BU×2.1, when the measuring cartridge is 700 cmg) or Krebs units, as described therein.

Figure 4:
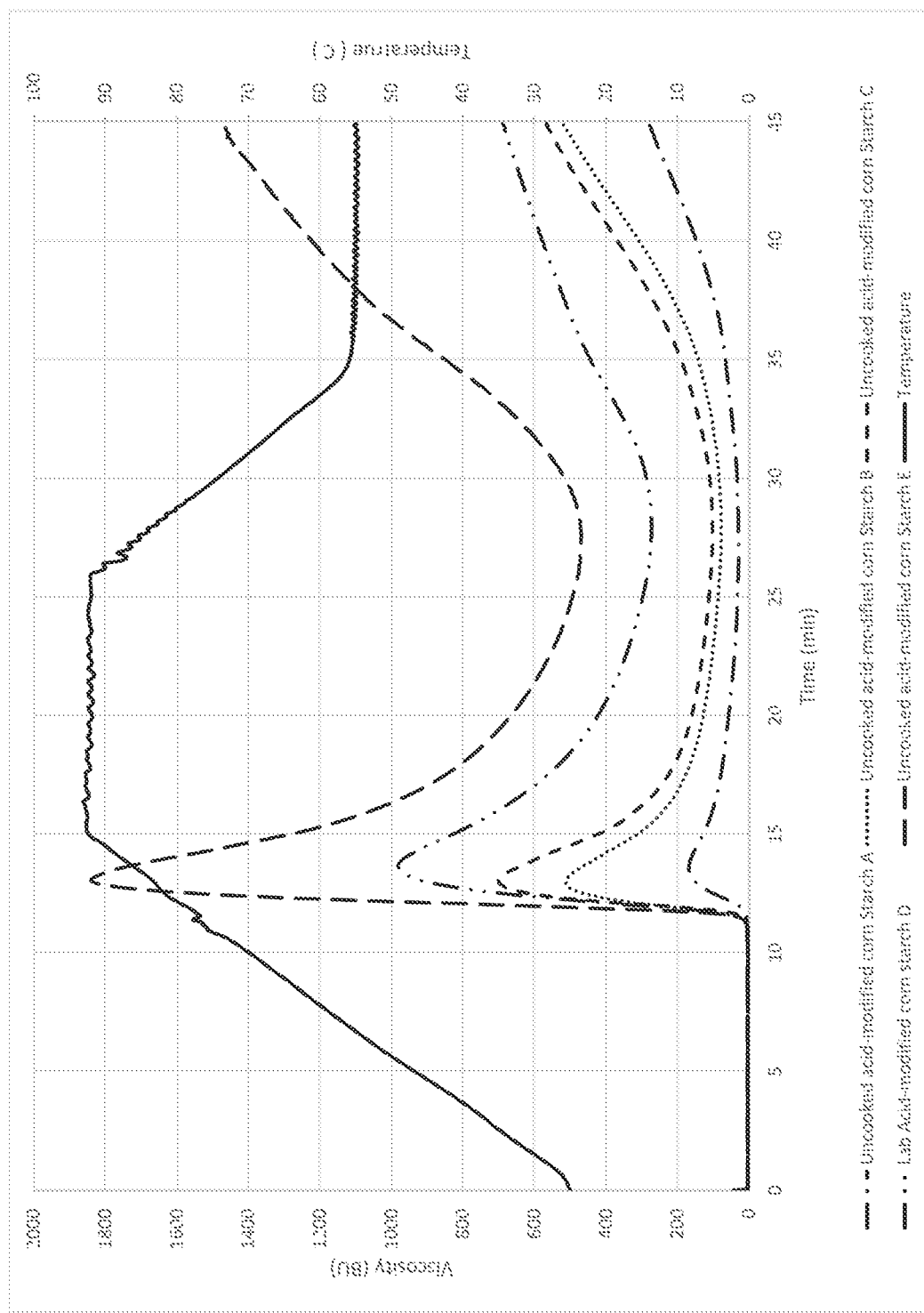
FIG. 4 is a Brabender amylogram of the slurries of 15% starch in water, illustrating the Hot Water Viscosity Assay (HWVA) of starch, where the X-axis is time and the Y-axis superimposes viscosity (primary Y-axis, on the left) and temperature (secondary Y-axis, on the right), in accordance with embodiments of the invention.

The torque (viscosity) and temperature curves, respectively, are labeled in FIG. 4. With respect to temperature, the target and actual temperatures are superimposed on each other but there is not an appreciable difference.

FIG. 4 demonstrates how the viscosity changes as the starch is cooked and is ultimately gelatinized. The torque measures the force to turn the rotor and therefore is a measurement of viscosity. The torque is in Brabender Units. The torque at the end of 92° C. of holding is defined as hot water viscosity. This hot water viscosity represents the average molecular weight of starch.

As seen from the amylogram of FIG. 4, at low temperature, before gelatinization, the viscosity does not appreciably change. As the granule is heated, it will absorb water and swell. Beginning at the peak of the torque curve, the granule is hot and swollen enough that the granular structure begins to break and separate into loose molecules. As the granular structure breaks down, the viscosity decreases until the starch is fully gelatinized as shown at the trough of the curve. This hot water viscosity represents the average molecular weight of the starch. As the curve levels off at the trough, the solution is cooled. As a result, retrogradation occurs as the gelatinized molecule begins to re-associate and the viscosity starts to increase again.

Example 5

This example demonstrates hot water viscosity of certain starches and strength of boards formed from a stucco slurry containing uncooked corn starch as compared with cooked (pregelatinized) starch.

Table 9 shows the composition used in preparing foamed gypsum board samples. The ingredients are as described in Example 3. Foam was added to bring the final density to 30 pcf. The formulation of the foam was 0.5% of soap solution with a ratio of unstable:stable soap of 1:1. The slurry was poured into a 1 foot×1 foot paper envelope and heated at 450° F. for 10 min, 375° F. for another 15 min, then was dried at 110° F. overnight.

TABLE 9

Compositions for forming foamed gypsum board samples

| | Compositions 5A-5E Weight (g) | Compositions 5A-5E Weight (% by weight of stucco) |
|---|---|---|
| Stucco | 500 | |
| Heat Resistant Accelerator | 5 | 1 |

TABLE 9-continued

Compositions for forming foamed gypsum board samples

| | Compositions 5A-5E Weight (g) | Compositions 5A-5E Weight (% by weight of stucco) |
|---|---|---|
| Starch | 10 | 2 |
| Sodium Trimetaphosphate | 1 | 0.2 |
| Retarder | 0.125 | 0.025 |
| Dispersant | 2.5 | 0.5 |
| Gauging Water | 387 | 77.4 |

The foamed gypsum board sample compositions differed only in the type of corn starch used. Composition 5A contained 10 g of uncooked acid-modified corn starch A (Clinton 277). Composition 5B contained 10 g of uncooked acid-modified corn starch B (Clinton 260). Composition 5C contained 10 g of uncooked acid-modified corn starch C (Clinton 240). Composition 5D contained 10 g of lab acid-modified starch D. Composition 5E contained 10 g of uncooked acid-modified corn starch E (Clinton 220). Composition 5F contained 10 g of pregelatinized starch B as a comparative.

Table 10 shows the hot water viscosity of the aforementioned starches, as well as nail pull strength of foamed gypsum samples formed from a slurry containing uncooked acid-modified corn starch as compared with foamed samples formed from a slurry containing pregelatinized starch.

TABLE 10

Hot water viscosity of acid modified corn starches and nail pull strength of resulting boards

| Sample | Starch Type | Hot Water Viscosity (BU) | Nail Pull Strength (lb) |
|---|---|---|---|
| 5A | Uncooked acid-modified corn starch A (Clinton 277) | 30 | 75.3 |
| 5B | Uncooked acid-modified corn starch B (Clinton 260) | 82 | 71.6 |
| 5C | Uncooked acid-modified corn starch C (Clinton 240) | 107 | 70.1 |
| 5D | Lab acid-modified corn starch | 284 | 65.7 |
| 5E | Uncooked acid-modified corn starch E (Clinton 220) | 477 | 40.6 |
| 5F | Pregelatinized starch B | N/A | 69.8 |

The lab acid-modified corn starch was modified by sulfuric acid to achieve a hot water viscosity of 284. Corn starches with a hot water viscosity between 30 BU to 284 BU had similar or better nail pull strength than pregelatinized starch. However, the starch with a hot water viscosity 477 BU had a detrimental effect on nail pull strength. Without wishing to be bound by any particular theory, it is believed that the starch molecules of the uncooked acid-modified corn starch E are too large to move out of starch granules and penetrate into gypsum crystal medium to enhance strength. An uncooked starch having a hot water viscosity below 477 BU (e.g., below about 400 BU), is thus preferred.

Example 6

This example demonstrates hot water viscosity of certain uncooked starches and nail pull of board cores formed from slurries, each containing one of the starches.

Starches with mid-range hot water viscosity were prepared by mixing starch (115 g) with sulfuric acid solution (250 g) and incubating at 50° C. for 3.5 hours. The concentration of sulfuric acid solutions for tapioca, wheat, and potato starch were 0.5 N, 0.6 N, and 1.0 N, respectively. Boards 6A-6D were formed from slurries of the formulation of Table 9 but with a different starch in each as indicated in Table 11.

Figure 5:
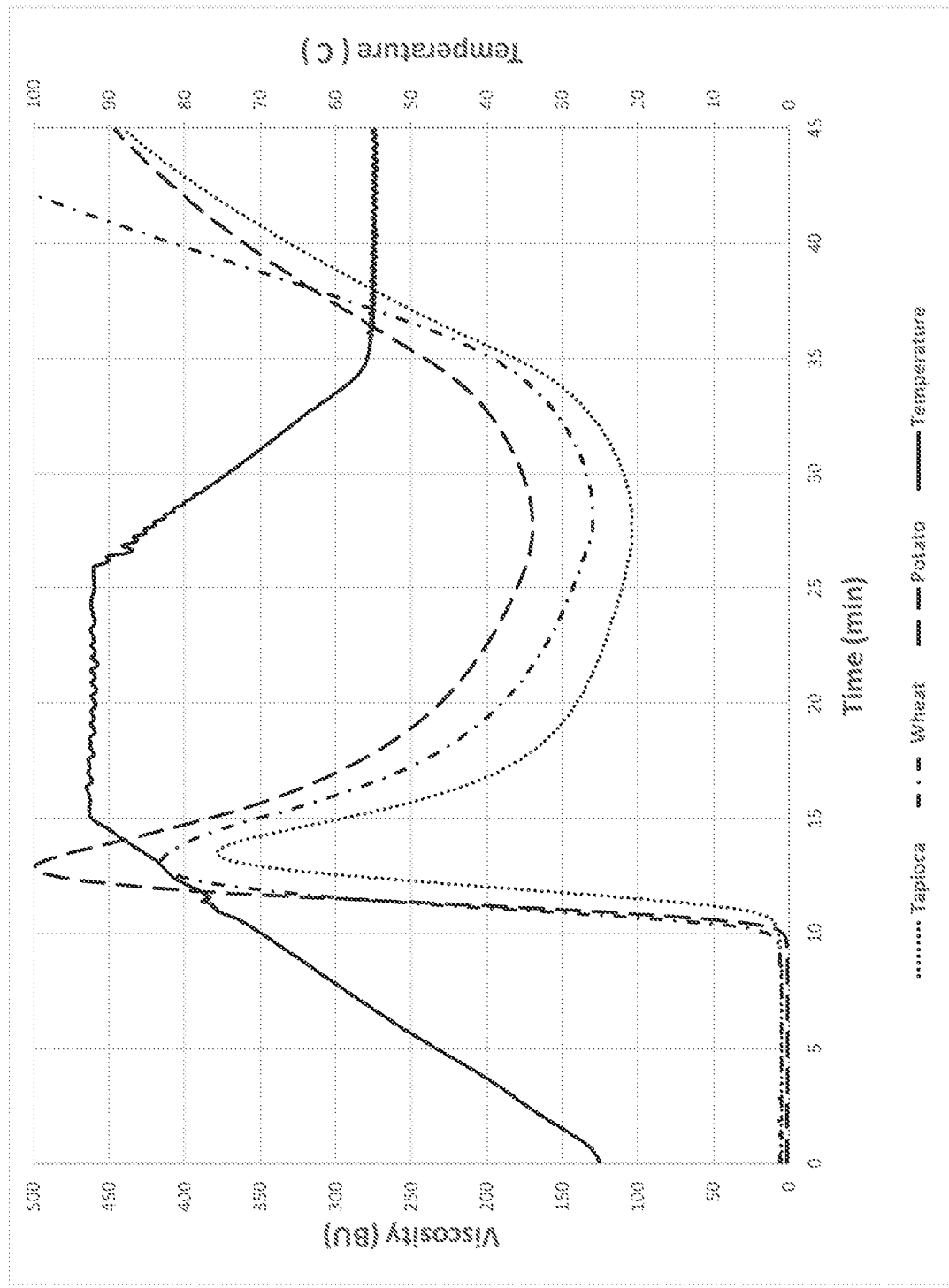
FIG. 5 is a Brabender amylogram of the slurries of 15% starch in water, illustrating the Hot Water Viscosity Assay (HWVA) of acid-modified tapioca, wheat, and potato starches, where the X-axis is time and the Y-axis superimposes viscosity (primary Y-axis, on the left) and temperature (secondary Y-axis, on the right), in accordance with embodiments of the invention.

FIG. 5 shows the hot water viscosity of acid-modified tapioca, wheat, and potato starch. Table 11 shows the hot water viscosity and nail pull strength of boards formed from acid-modified tapioca, wheat, and potato starches with mid-range hot water viscosity.

TABLE 11

Hot water viscosity of acid-modified tapioca, wheat, and potato starch and nail pull of resulting boards

| Board | Starch Type | Hot Water Viscosity (BU) | Nail Pull Strength (lb) |
|---|---|---|---|
| 6A | Acid modified tapioca | 107 | 73.6 |
| 6B | Acid modified wheat | 138 | 74.5 |
| 6C | Acid modified potato | 174 | 71.3 |
| 6D | Uncooked acid-modified corn Starch B (Clinton 260) | 30 | 71.6 |

Boards containing cores formed from a stucco slurry containing acid modified tapioca, wheat, and potato starches with mid-range hot water viscosity had similar nail pull strength as boards containing board cores formed from a slurry containing acid modified corn starch with mid-range hot water viscosity.

Example 7

This example demonstrates water usage and nail pull strength of boards 7A-7D made on a plant production line. The boards contained cores formed from slurries containing either pregelatinized starch or an uncooked starch. The remaining ingredients other than starch and water remained the same during the experiment. However, it is contemplated that board hydration could be adjusted as described in Example 9.

Table 12 shows the starch type in each production board, as well as the amount of starch and water used in the stucco slurry for forming the board core, and the nail pull of the resulting board.

TABLE 12

| Board | Starch type | Starch Usage (lb/MSF) | Total Water (lb/MSF) | Nail pull (lbf) |
|---|---|---|---|---|
| 7A | Pregelatinized Corn Starch B | 13 | 845.6 | 82.3 |
| 7B | Uncooked acid-modified corn starch B (Clinton 260) | 13 | 817.3 | 81.9 |
| 7C | Pregelatinized Corn Starch B | 12 | 993.0 | 93.7 |
| 7D | Uncooked acid-modified corn starch B (Clinton 260) | 12 | 966.0 | 92.9 |

As seen in Table 12, production boards formed from slurry containing uncooked starch exhibited similar nail pull resistance results as board formed from stucco slurry containing pregelatinized starch. The slurry containing uncooked starch required substantially lower water usage.

Example 8

This example demonstrates the use of starch in a board containing a board core and a concentrated layer as described in U.S. patent application Ser. Nos. 15/186,176, 15/186,212, 15/186,232, and 15/186,257. Two boards were tested, with the difference being the type of starch in the concentrated layer. The formulations of the slurries used in forming the core and the concentrated layer, respectively, in the boards are found in Tables 13A and 13B with other ingredients in the slurry remaining relatively similar with the exceptions of heat resistant accelerator and alum to adjust the hydration as described in Example 9. The starch in the board cores was pregelatinized corn starch B. The starch in the concentrated layers is set forth in Table 14.

TABLE 13A (Pregelatinized Corn Starch B)

| | Core | | Concentrated Layer | |
|---|---|---|---|---|
| Ingredient | Weight (lbs/MSF) | Wt. % of stucco | Weight (lbs/MSF) | Wt. % of stucco |
| Heat Resistant Accelerator | 14.37 | 1.98% | 2.43 | 2.71% |
| Alum | 0.40 | 0.06% | 0.04 | 0.04% |
| Water | 584.90 | 80.73% | 163.00 | 182.12% |

TABLE 13B (Uncooked acid-modified corn starch B (Clinton 260)

| | Core | | Concentrated Layer | |
|---|---|---|---|---|
| Ingredient | Weight (lbs/MSF) | Wt. % of stucco | Weight (lbs/MSF) | Wt. % of stucco |
| Heat Resistant Accelerator | 13.72 | 1.89% | 1.98 | 2.21% |
| Alum | 0.40 | 0.06% | 0.00 | 0.00% |
| Water | 577.00 | 79.55% | 120.40 | 134.23% |

The boards were tested for water content in the gypsum slurries and for nail pull resistance in the resulting boards as described herein.

TABLE 14

| Board | Starch Type | Concentrated Layer Starch Content (lbs/msf) | Nail pull (lbf) | Concentrated Layer Water Content (lbs/msf) |
|---|---|---|---|---|
| 8A | Pregelatinized Corn Starch B | 20 | 80.8 | 163 |
| 8B | Uncooked acid-modified corn starch B (Clinton 260) | 20 | 79.9 | 120 |

As seen in Table 14, the boards had comparable nail pull results and the stucco slurry of the concentrated layer exhibited less water demand.

Example 9

This example demonstrates the effect of setting time on board production quality.

The rehydration rate of stucco can be affected by many influences. The rate of hydration for three different gypsum slurries were evaluated. The slurries differed with respect to the type of starch included. The results are shown in Table 15. As Table 15 shows, starch type and characteristics can play a role in gypsum hydration, which can lead to manufacturability issues.

TABLE 15

| | Pregelatinized corn starch B | Uncooked acid-modified corn starch B (Clinton 260) | Uncooked acid-modified corn starch B (Clinton 260) |
|---|---|---|---|
| Water/Stucco Ratio (WSR) | 0.9 | 0.9 | 0.85 |
| 50% Hydration (min) | 3.75 | 3.58 | 3.33 |

Figure 6:
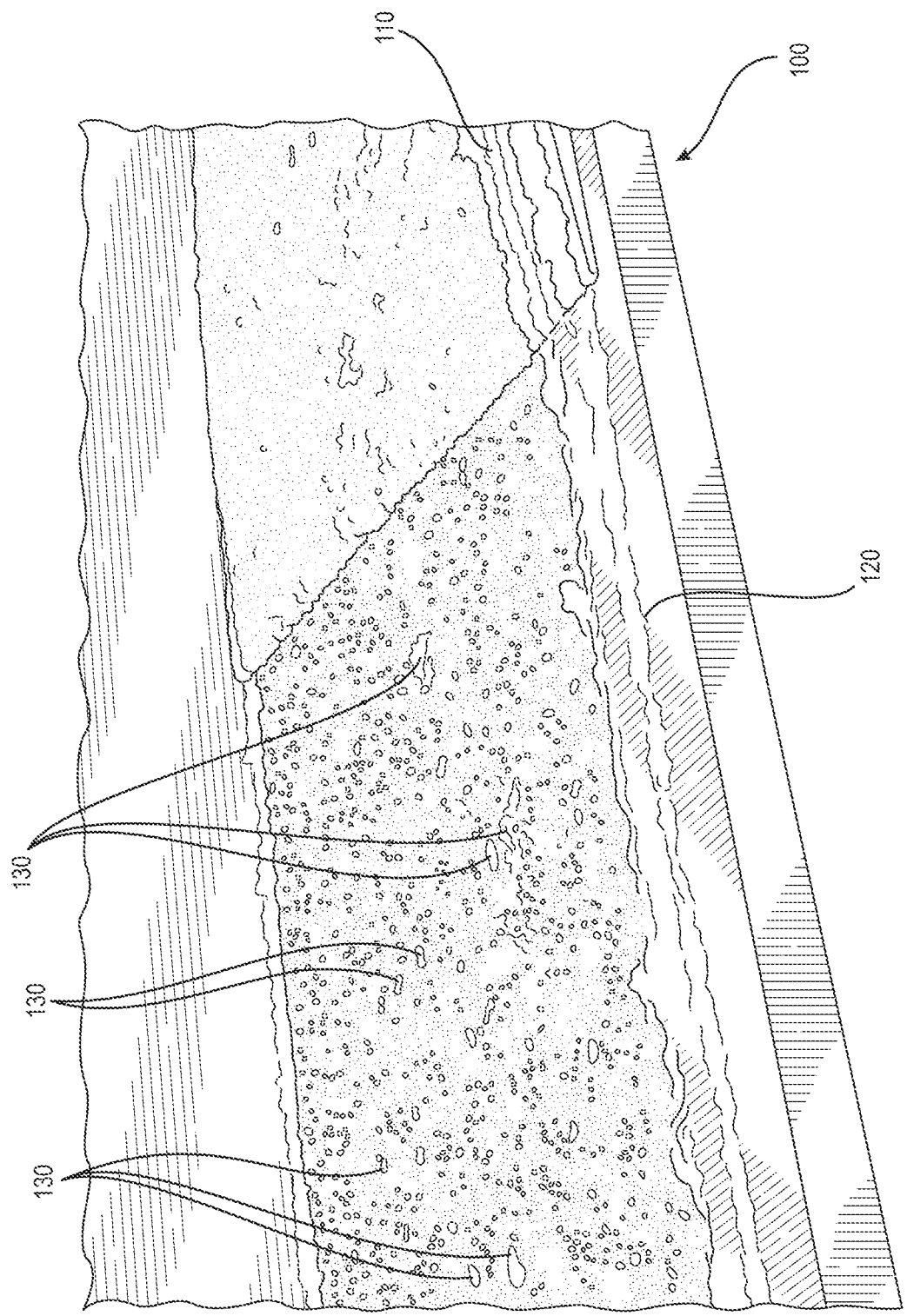
FIG. 6 is an illustration depicting a board product with a cover sheet pulled back to show a board core defect (blisters), as discussed in Example 9 herein.

Two different boards, 9A and 9B were prepared according to the formulations of Table 16 with ingredients as described in Table 16 and Example 3. Table 16 shows an unsuccessful attempt at manufacturing product because it resulted in blisters and loss of bond prior to entry into the kiln as shown in FIG. 6. As seen in FIG. 6, a board 100 with the paper cover sheet 110 peeled back is shown. The board 100 contains a core 120. The board 100 contains undesirable blisters 130, believed to be caused by poor set characteristics. Table 16 also shows a similar formulation with a change in the amount of accelerator, which allowed for correcting the defect by modifying the set characteristics of the stucco slurry (i.e., by reducing the amount of accelerator) to prevent a rate of hydration that was too rapid.

TABLE 16

| | Figure 6 Defect Present Board 9A | | Figure 6 Defect Not Present Board 9B | |
|---|---|---|---|---|
| Ingredients | Weight (lbs/msf) | Weight (% by weight of stucco) | Weight (lbs/msf) | Weight (% by weight of stucco) |
| Stucco | 1350 | | 1343 | |
| Heat Resistant Accelerator | 31 | 2.30% | 24 | 1.79% |
| Uncooked acid-modified cornstarch B (Clinton 260) | 12 | 0.89% | 12 | 0.89% |
| PNS | 3 | 0.22% | 4 | 0.30% |
| Retarder (1% solution) | 0.4 | 0.03% | 0.4 | 0.03% |
| Total Water | 992 | 73.48% | 987 | 73.49% |

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. As used herein, the term "exemplary" indicates an example thereof and does not suggest a best or optimal of the recited item. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum board comprising:
a set gypsum core disposed between two cover sheets, the core formed from a slurry comprising stucco, water, and at least one uncooked starch prepared by hydrolyzing glycosidic bonds in a native starch such that a hot water viscosity of the uncooked starch is from about 20 Brabender Units to about 300 Brabender Units when the viscosity is measured by the HWVA method, wherein the uncooked starch is an uncooked acid-modified native starch.

2. The gypsum board of claim 1, wherein the native starch is tapioca starch, wheat starch, potato starch, and/or corn starch.

3. The gypsum board of claim 2, wherein the uncooked starch has a hot water viscosity of from about 30 BU to about 200 BU.

4. The gypsum board of claim 1, wherein the uncooked starch has a cold water viscosity of less than about 50 centipoise at 10% solids, as measured according to the BROOKFIELD viscometer method.

5. The gypsum board of claim 1, wherein the uncooked starch has a peak viscosity of from about 120 BU to about 1000 BU when the viscosity is measured by putting the starch in a slurry with water at a starch concentration of 15% solids, and using a VISCOGRAPH-E instrument set at 75 rpm and 700 cmg, where the starch is heated from 25 QC to 95 QC at a rate of 3 QC/minute, the slurry is held at 95 QC for ten minutes, and the starch is cooled to 50 QC at a rate of −3 QC/minute.

6. The gypsum board of claim 1, wherein the slurry further comprises a polyphosphate.

7. The gypsum board of claim 6, wherein the polyphosphate is sodium trimetaphosphate, and the slurry further comprises a dispersant.

8. The gypsum board of claim 1, wherein the uncooked starch has a bulk density of from about 35 pcf to about 45 pcf, the uncooked starch is acid-modified, the uncooked starch has a cold water viscosity of less than about 50 centipoise at 10% solids, as measured according to the BROOKFIELD viscometer method, and the board has a density of from about 16 pcf to about 35 pcf.

9. The gypsum board of claim 1, wherein the board has a nail pull resistance of at least about 72 lb-f according to ASTM 473-10, method B.

10. The gypsum board of claim 1, the uncooked starch having a cold water viscosity at 10% of solids of from about 5 centipoise to about 50 centipoise when the viscosity is measured by the BROOKFIELD viscometer method at 25° C., and a peak viscosity of from about 120 BU to about 1000 BU, when the viscosity is measured by putting the starch in a slurry with water at a starch concentration of 15% solids, and using a VISCOGRAPH-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

11. The gypsum board of claim 10, wherein the uncooked starch has a cold water viscosity of from about 1 centipoise to about 20 centipoise, and the board has a density of from about 16 pcf to about 35 pcf.

12. The gypsum board of claim 1, wherein the uncooked acid-modified native starch is acid modified using an acid comprising sulfuric acid, hydrochloric acid, nitric acid, or hydrofluoric acid.

13. The gypsum board of claim 1, wherein the uncooked acid-modified native starch is neutralized by an alkali during acid modification to stop hydrolysis.

14. The gypsum board of claim 13, wherein the uncooked acid-modified native starch is added to the slurry directly after neutralization.

15. The gypsum board of claim 1, wherein the uncooked acid-modified native starch is incorporated in a starch composition comprising sulfate and calcium ions before being added to the slurry.

* * * * *